(12) United States Patent
Miyabayashi

(10) Patent No.: US 6,538,047 B1
(45) Date of Patent: Mar. 25, 2003

(54) INK COMPOSITION AND INK JET RECORDING METHOD USING THE SAME

(75) Inventor: Toshiyuki Miyabayashi, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/670,710

(22) Filed: Sep. 27, 2000

(30) Foreign Application Priority Data

| Sep. 29, 1999 | (JP) | ............................................. 11-276971 |
| Sep. 18, 2000 | (JP) | ........................................ 2000-282115 |
| Sep. 22, 2000 | (JP) | ........................................ 2000-289319 |

(51) Int. Cl.$^7$ ........................... C09D 11/10; C08K 9/10; C08L 33/02; C08L 33/06; B41J 2/01

(52) U.S. Cl. ........................ 523/160; 523/205; 524/556; 347/96; 347/100

(58) Field of Search ................................ 523/160, 161, 523/205; 524/556, 555; 106/31.6; 347/96, 98, 100

(56) References Cited

U.S. PATENT DOCUMENTS

| 2,083,372 | A |   | 6/1937  | Guthmann ..................... 134/29 |
| 4,445,124 | A | * | 4/1984  | Fujii et al. ..................... 347/89 |
| 4,948,772 | A | * | 8/1990  | Hoshino et al. ............. 503/207 |
| 5,156,675 | A |   | 10/1992 | Breton et al. ................... 106/22 |
| 5,183,502 | A |   | 2/1993  | Meichsner et al. ......... 106/22 K |
| 5,196,056 | A |   | 3/1993  | Prasad ..................... 106/15.05 |
| 5,718,746 | A |   | 2/1998  | Nagasawa .................. 106/31.9 |
| 5,734,403 | A |   | 3/1998  | Suga et al. .................. 347/101 |
| 5,849,815 | A | * | 12/1998 | Aoki et al. .................. 523/161 |
| 5,891,950 | A | * | 4/1999  | Collins et al. .............. 524/502 |
| 5,965,634 | A | * | 10/1999 | Idogawa et al. ............. 523/161 |
| 6,057,384 | A | * | 5/2000  | Nguyen et al. .............. 523/160 |
| 6,204,307 | B1 | * | 3/2001 | Miyabayashi ............... 523/160 |
| 6,248,805 | B1 | * | 6/2001 | Nguyen et al. .............. 523/160 |
| 6,336,965 | B1 | * | 1/2002 | Johnson et al. ............ 106/31.6 |

FOREIGN PATENT DOCUMENTS

| EP | 0534634  |   | 3/1993  |
| EP | 739743   | * | 10/1996 |
| EP | 0859037  |   | 8/1998  |
| JP | 55157668 |   | 12/1980 |
| JP | 5628256  |   | 3/1981  |
| JP | 56147859 |   | 11/1981 |
| JP | 56147860 |   | 11/1981 |
| JP | 56147861 |   | 11/1981 |
| JP | 621426   |   | 1/1987  |
| JP | 1115976  |   | 5/1989  |
| JP | 1217088  |   | 8/1989  |
| JP | 2276874  |   | 11/1990 |
| JP | 360068   |   | 3/1991  |
| JP | 03240557 |   | 10/1991 |
| JP | 03240558 |   | 10/1991 |
| JP | 418462   |   | 1/1992  |
| JP | 45703    |   | 2/1992  |
| JP | 5202328  |   | 8/1993  |
| JP | 5320276  |   | 12/1993 |
| JP | 5339516  |   | 12/1993 |
| JP | 6106735  |   | 4/1994  |
| JP | 794634   |   | 10/1995 |
| JP | 7278479  |   | 10/1995 |
| JP | 859715   |   | 3/1996  |
| JP | 881647   |   | 3/1996  |
| JP | 8218015  |   | 8/1996  |
| JP | 8259869  |   | 10/1996 |
| JP | 8302227  |   | 11/1996 |
| JP | 8302228  |   | 11/1996 |
| JP | 8319444  |   | 12/1996 |
| JP | 931360   |   | 2/1997  |
| JP | 9111165  |   | 4/1997  |
| JP | 9279053  |   | 10/1997 |
| JP | 9286939  |   | 11/1997 |
| JP | 10316909 |   | 12/1998 |

OTHER PUBLICATIONS

Atkins, P.W.; Physical Chemistry, W.H. Freeman and Company, New York, 1978 (pp. 464–465).*
English Translation of JP 10316909 (1998).*
Patent Abstracts of Japan: JP 09279053 dated Oct. 28, 1997.
Derwent Abstract: JP10316909 dated Feb. 2, 1998; Abstract No. XP–002153618.
Derwent Abstract: JP5320276 dated Dec. 3, 1993; Abstract No. XP–002153617.
Patent Abstracts of Japan of JP 01115976 of May 1989.
Patent Abstracts of Japan of JP 08059715 of Mar. 1996.
Patent Abstracts of Japan of JP 05339516 of Dec. 1993.
Patent Abstracts of Japan of JP 08302227 of Nov. 1996.
Patent Abstracts of Japan of JP 08302228 of Nov. 1996.
Patent Abstracts of Japan of JP 08–081647 of Mar. 1996.
Patent Abstracts of Japan of JP 56028256 of Mar. 1981.
Patent Abstracts of Japan of JP 55157668 of Dec. 1980.
Patent Abstracts of Japan of JP 03060068 of Mar. 1981.
Patent Abstracts of Japan of JP 04018462 of Jan. 1992.
Patent Abstracts of Japan of JP 56147859 of Nov. 1981.
Patent Abstracts of Japan of JP 56147860 of Nov. 1981.
Patent Abstracts of Japan of JP 02276874 of Nov. 1990.
Patent Abstracts of Japan of JP 08259869 of Oct. 1996.
Patent Abstracts of Japan of JP 07278479 of Oct. 1995.
Patent Abstracts of Japan of JP 05320276 of Dec. 1993.
Patent Abstracts of Japan of JP 10316909 of Dec. 1998.
Patent Abstracts of Japan of JP 09031360 of Feb. 1997.
Patent Abstracts of Japan of JP 56147861 of Nov. 1981.
Patent Abstracts of Japan of JP 03240557 dated Oct. 1991.
Patent Abstracts of Japan of JP 03240558 dated Oct. 1991.

* cited by examiner

*Primary Examiner*—Vasu Jagannathan
*Assistant Examiner*—Callie E. Shosho
(74) *Attorney, Agent, or Firm*—Ladas & Parry

(57) ABSTRACT

An ink composition is provided which possesses excellent dispersion stability and ejection stability and can yield printed images having excellent rubbing/scratch resistance. An ink jet recording method using the ink composition is also provided. The ink composition for ink jet recording comprises at least a water-based pigment dispersion, a water-soluble organic solvent, and water. The water-based pigment dispersion is such that a pigment has been encapsulated in a polymer produced from a polymerizable surfactant having both nonionic hydrophilicity and anionic hydrophilicity and a monomer having a ligand structure which can combine with a metal ion to form a chelate.

37 Claims, 3 Drawing Sheets

INK COMPOSITION AND INK JET RECORDING METHOD USING THE SAME

BACKGROUND OF THE INVENTION

1. Field of the Invention

The present invention relates to an ink composition which can yield printed images having high quality on recording media, and an ink jet recording method using the same.

2. Background Art

Ink jet recording is a recording method wherein droplets of ink are ejected through fine nozzles to form letters or figures on the surface of recording media. Various properties are required of inks used in such ink jet recording, and examples thereof include good dispersion stability, ejection stability, and rubbing/scratch resistance of prints.

Inks comprising various water-soluble dyes dissolved in aqueous media have generally been used. Further, inks comprising pigments dispersed in aqueous media have also been provided. Inks comprising pigments dispersed in aqueous media are advantageously superior to inks using water-soluble dyes in waterfastness and lightfastness of printed images.

On the other hand, the use of a pigment in a water-based ink composition poses a problem of dispersion stability. In this case, in order to stably disperse the pigment in an aqueous medium, polymeric dispersants, surfactants or the like are generally used as a dispersant. An ink using a pigment, the surface of which has been subjected to some treatment for enhancing ejection stability, dispersion stability, print density, color development, etc., has also been proposed in the art. For example, Japanese Patent Laid-Open No. 319444/1996 proposes surface-oxidized pigment particles, Japanese Patent Publication No. 94634/1995 and Japanese Patent Laid-Open No. 59715/1996 propose encapsulated fine particles of pigment, and Japanese Patent Laid-Open Nos. 339516/1993, 302227/1996, 302228/1996, and 81647/1996 propose pigment particles with a polymer grafted on the surface thereof.

In addition to the above proposals, proposals on techniques for improving the fixation of pigment on recording media have been made. For example, Japanese Patent Laid-Open No. 218015/1996 proposes an ink using a pigment which has been coated with a resin having a film-forming property at room temperature by a phase inversion emulsion method. Japanese Patent Laid-Open No. 31360/1997 proposes an ink using a pigment which has been coated with an anionic group-containing organic polymer compound by a salting-out method. Japanese Patent Laid-Open No. 286939/1997 proposes an ink using a polymer emulsion wherein fine particles of a polymer have been impregnated with a colorant by a phase inversion emulsion method.

Further, the addition of a resin to an ink composition has been proposed from the viewpoint of improving the fixation of a colorant onto recording media. It is considered that this resin serves as a binder to strongly fix the colorant onto recording media. Regarding resin-containing ink compositions, for example, Japanese Patent Publication No. 1426/1987 proposes an ink comprising a pigment and a resin emulsion dispersed in water, Japanese Patent Laid-Open No. 157668/1980 proposes that a pigment is dispersed in a water-insoluble resin emulsion dispersion, Japanese Patent Laid-Open No. 217088/1989 proposes the use of an emulsion having a specific film-forming temperature, and, likewise, Japanese Patent Laid-Open Nos. 60068/1991 and 18462/1992 propose an ink using a resin emulsion.

Further, the addition of a penetrating agent has been proposed from the viewpoint of improving the penetration of ink into paper. For example, Japanese Patent Laid-Open No. 147861/1981 proposes the use of triethylene glycol monomethyl ether, Japanese Patent Laid-Open No. 111165/1997 proposes the use of ethers of ethylene glycol, diethylene glycol, or triethylene glycol. Further, U.S. Pat. No. 5,156,675 proposes the addition of diethylene glycol monobutyl ether, U.S. Pat. No. 5,183,502 proposes the addition of Surfynol 465, which is an acetylene glycol surfactant manufactured by Nissin Chemical Industry Co., Ltd., and U.S. Pat. No. 5,196,056 proposes the use of diethylene glycol monobutyl ether in combination with Surfynol 465. Furthermore, U.S. Pat. No. 2,083,372 proposes the use of ethers of diethylene glycol in inks.

SUMMARY OF THE INVENTION

The present inventors have now found that the use of a water-based pigment dispersion produced by enmicrocapsulation of a pigment in a polymer produced from a polymerizable surfactant having both nonionic hydrophilicity and anionic hydrophilicity and a monomer having a ligand structure, which can combine with a metal ion to form a chelate, can provide an excellent ink composition. In particular, the present inventors have found that the use of the above water-based pigment dispersion can provide an ink composition which, by virtue of excellent dispersion stability and ejection stability, is free from nozzle clogging, can realize stable printing and excellent print quality. The present inventors have further found that a combination of the pigment dispersion with fine particles of a polymer can provide an ink composition which can yield printed images having excellent rubbing/scratching resistance. The present inventors have further found that the deposition of two liquids, that is, the ink composition according to the present invention and a reaction solution containing a reactant capable of producing coagulate upon contact with this ink composition, onto a recording medium to perform printing can realize an ink jet recording method which can improve coagulation and fast drying properties and can provide significantly good print quality. The present invention has been made based on such finding.

Accordingly, it is an object of the present invention to provide an ink composition for ink jet recording, which possesses excellent dispersion stability and ejection stability and can yield printed images having excellent rubbing/scratching resistance, fast drying properties, and print quality, and an ink jet recording method using the same.

According to one aspect of the present invention, there is provided an ink composition for ink jet recording.

The ink composition for ink jet recording according to the present invention comprises at least a water-based pigment dispersion, a water-soluble organic solvent, and water, the water-based pigment dispersion being such that a pigment has been encapsulated in a polymer produced from a polymerizable surfactant having both nonionic hydrophilicity and anionic hydrophilicity and a monomer having a ligand structure which can combine with a metal ion to form a chelate.

According to another aspect of the present invention, there is provided an ink jet recording method using two liquids.

The ink jet recording method using two liquids according to the present invention comprises the step of depositing, on a recording medium, an ink composition and a reaction solution containing a reactant which, when brought into contact with the ink composition, produces coagulate, thereby performing printing, the ink composition comprising at least a water-based pigment dispersion, a water-soluble organic solvent, and water, the water-based pigment dispersion being such that a pigment has been encapsulated in a polymer produced from a polymerizable surfactant having both nonionic hydrophilicity and anionic hydrophilicity and a monomer having a ligand structure which can combine with a metal ion to form a chelate.

DESCRIPTION OF THE PREFERRED EMBODIMENTS

Ink Composition

Figure 1:
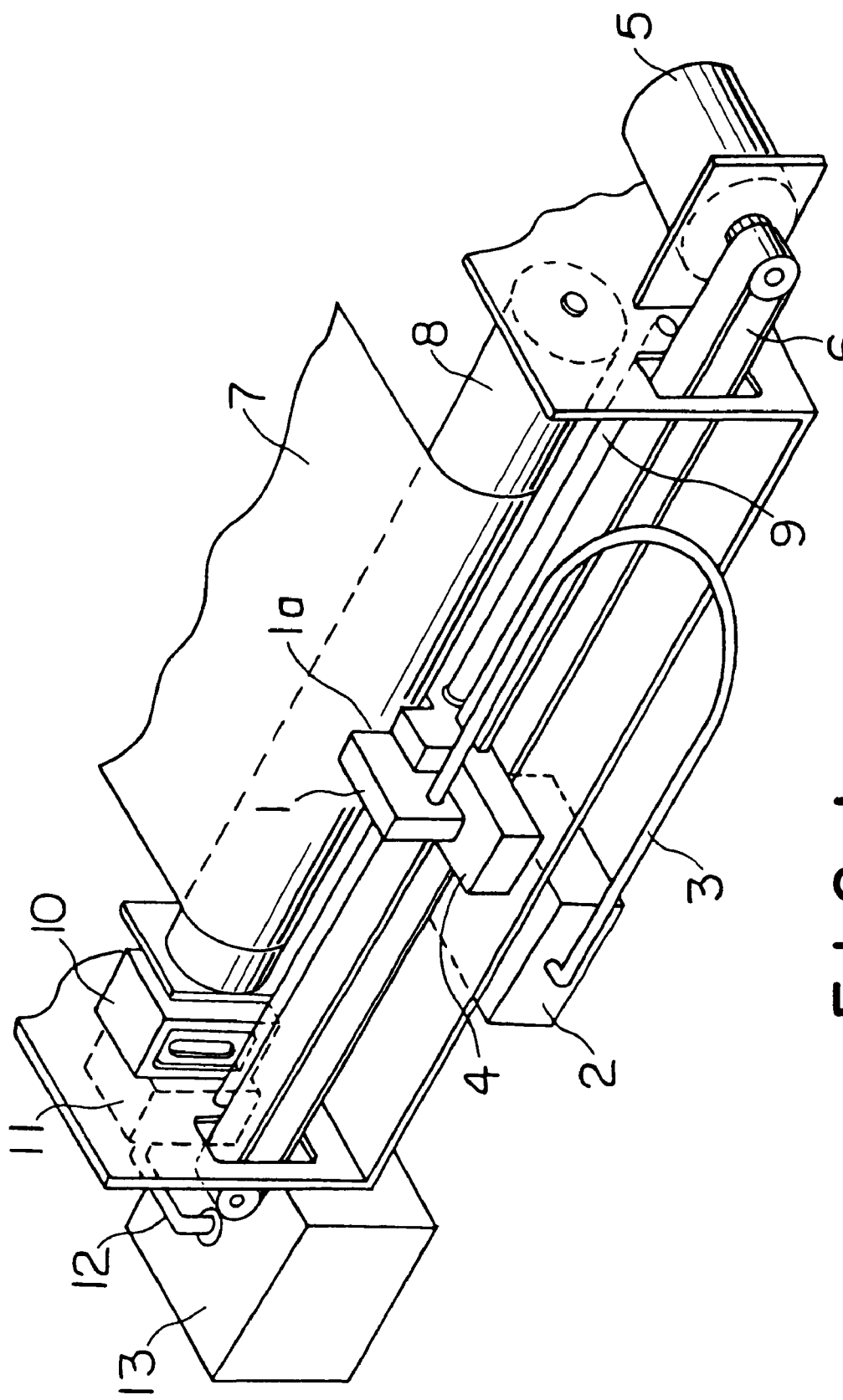
FIG. 1 is a diagram showing an embodiment of the ink jet recording apparatus according to the present invention, wherein a recording head is provided separately from an ink tank and an ink composition and a reaction solution are fed into the recording head through an ink tube.

The ink composition according to the present invention comprises at least a water-based pigment dispersion, a water-soluble organic solvent, and water. The ink composition according to the present invention can be used as an ink for handwriting or an ink for writing implements, such as ballpoint pens and fountain pens, and is preferably used in ink jet recording.

Water-based Pigment Dispersion

The water-based pigment dispersion according to the present invention comprises minute and stable encapsulated particles of a pigment encapsulated in a polymer produced from a polymerizable surfactant having both nonionic hydrophilicity and anionic hydrophilicity and a monomer having a ligand structure which can combine with a metal ion to form a chelate. The "water-based pigment dispersion" refers to a stable dispersion of minute and stable encapsulated particles of a pigment in an aqueous medium. Therefore, according to the present invention, the minute and stable encapsulated particles of a pigment often refer to colored particles. The polymerizable surfactant having both anionic hydrophilicity and nonionic hydrophilicity adsorbs on the surface of pigment particles, has excellent dispersion stability even under conditions for subsequent polymerization, that is, can prevent coagulation among particles, and thus advantageously can easily form encapsulated particles.

The water-based pigment dispersion according to the present invention has excellent dispersion stability. The reason for this has not been fully elucidated yet. However, it is believed that, as described above, as compared with mere adsorption of a dispersant on the surface of pigment particles inspired by van der Waals forces, the encapsulation of the pigment can provide mechanically stronger fixation of the dispersant on the surface of pigment particles. The above theory is used only for explaining the present invention, and should not be construed as limiting the scope of the present invention.

Preferred polymerizable surfactants having both anionic hydrophilicity and nonionic hydrophilicity usable in the present invention include compounds represented by formula (I). Polymerizable surfactants represented by formula (I) are disclosed in Japanese Patent Laid-Open Nos. 320276/1993 and 316909/1998.

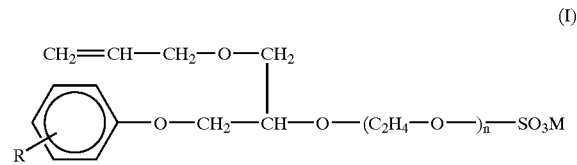

(I)

wherein

R represents a hydrogen atom or a hydrocarbon residue having 1 to 12 carbon atoms; n is a number of 2 to 20; and M represents an alkali metal atom, an ammonium salt, or an alkanolamine.

Properly regulating R and n value in formula (I) permits the hydrophilicity or the hydrophobicity to be made equivalent to that of the surface of the pigment. Specific examples of preferred polymerizable surfactants represented by formula (I) include compounds represented by formulae (II) to (V). They may be used alone or as a mixture of two or more. According to a preferred embodiment of the present invention, the polymerizable surfactant is copolymerized although the polymerizable surfactant may be homopolymerized.

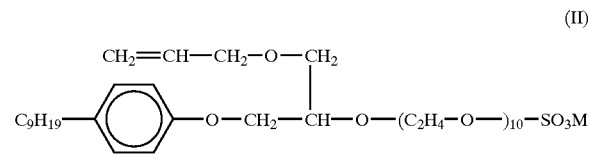

(II)

M:NH$_4$

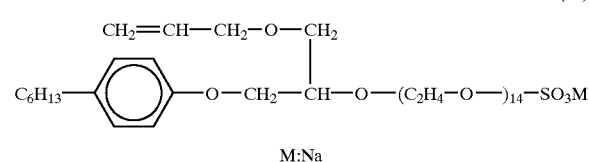

(III)

M:Na

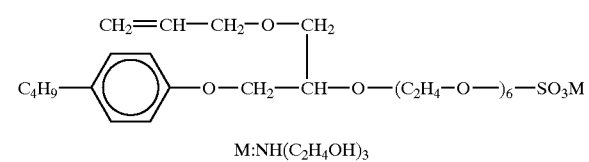

(IV)

M:NH(C$_2$H$_4$OH)$_3$

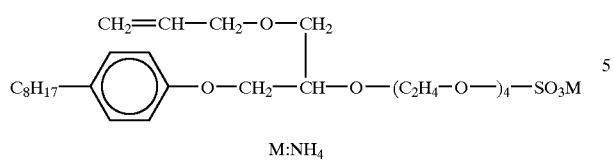

M:NH$_4$

According to the present invention, commercially available products may also be used as the polymerizable surfactant, and examples thereof include Aqualon HS Series manufactured by Dai-Ichi Kogyo Seiyaku Co., Ltd. (Aqualon HS-05, HS-10, HS-20, and HS-1025), Aqualon RN Series manufactured by Dai-Ichi Kogyo Seiyaku Co., Ltd. (RN-10, RN-20, RN-30, RN-50, and RN-2025), New Frontier Series manufactured by Dai-Ichi Kogyo Seiyaku Co., Ltd. (New Frontier N-177E and S-510), Adeka Reasoap SE Series manufactured by Asahi Denka Kogyo Ltd. (SE-10N and SE-20N), and Adeka Reasoap NE Series manufactured by Asahi Denka Kogyo Ltd. (NE-10, NE-20, NE-30, NE-40, and NE-50). Among them, Adeka Reasoap SE Series SE-10N and SE-20N are particularly preferred.

The amount of the polymerizable surfactant added is preferably about 10 to 150% by weight, more preferably about 20 to 100% by weight, based on the pigment. The addition of the polymerizable surfactant in an amount of not less than 10% by weight can improve the dispersion stability of the ink composition. The addition of the polymerizable surfactant in an amount of not more than 150% by weight can inhibit the occurrence of the polymerizable surfactant remaining unadsorbed on the pigment and can prevent polymer other than that involved in encapsulated particles from being present. This can improve the ejection stability of the ink composition.

The water-based pigment dispersion according to the present invention can be produced by dispersing a pigment in water and/or a water-soluble organic solvent with the aid of a polymerizable surfactant and then polymerizing the dispersion and a monomer having a ligand structure, which can combine with a metal ion to form a chelate, in the presence of a polymerization initiator. This type of a monomer can enhance the dispersion stability of the water-based pigment dispersion and functions to impart, to the water-based pigment dispersion (particularly to the surface thereof), a group which can combine with a polyvalent metal ion to form a chelate. According to the present invention, the ligand structure, which can combine with a metal ion to form a chelate, possessed by the colored particles in the water-based pigment dispersion refers to a structrue having a plurality of atoms for feeding electrons for forming a coordination bond, the plurality of atoms being present at suitable intervals so that the plurality of atoms form a metal chelate compound in such a manner that the metal ion is sandwiched between the plurality of atoms.

According to a preferred embodiment of the present invention, examples of such ligand structures include β-diketone, polyamine, iminodiacetic acid, sarcosine, ethanolamino acid, glycine, xanthogenic acid, amidoxime, amine, pyridine, imidazole, phosphonic acid, phosphinic acid, phosphoric acid, Schiff base, oxime, hydroxame, aminopolycarboxylic acid, thiol, polythioalcohol, 2-pyrrolidone, and 2-oxazolidone structures.

Further, according to a specific embodiment of the present invention, the ligand structure, which can combine with the metal ion to form a chelate, may be represented, for example, by formula:

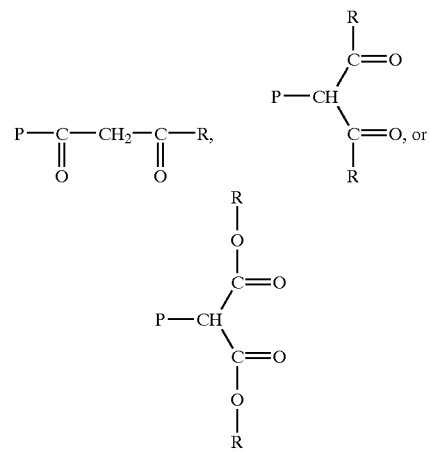

wherein
P represents a polymer structure portion; and
R represents an alkyl group, preferably a $C_{1-20}$ alkyl group, more preferably a $C_{1-10}$ alkyl group, most preferably a methyl group, or an aryl group, for example, phenyl, naphthyl, or tolyl.

A possible structure of a metal chelate formed by the ligand structure represented by the above formula and, for example, a divalent metal is represented by formula:

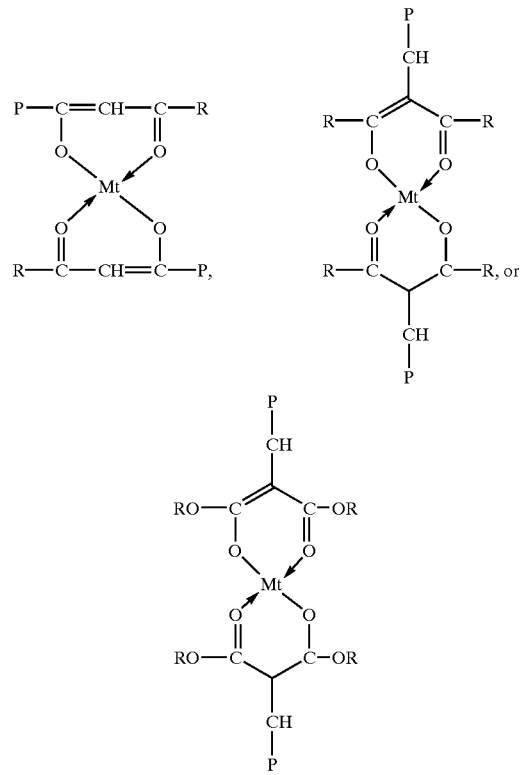

wherein
Mt represents a divalent metal; and P and R are as defined above.

According to a pref erred embodiment of the present invention, specific examples of monomers having a ligand structure capable of combining with a metal ion to form a chelate include methacryloyl acetone, methacryloyldiacetylmethane, acryloyl acetyl acetone, diethyl acryloylmalonate, diethyl methacryloylmalonate, and 2-(methacryloxy)ethyl acetoacetate. Preferred are methacryloyl acetone, methacryloyl diacetyl methane, and acryloyl acetyl acetone.

The reason why good images can be realized by the ink composition containing the above monomer is considered as follows.

Upon the deposition of the ink composition on the surface of a recording medium, the solvent component penetrates the recording medium or is evaporated to fix the colored particles in the pigment dispersion onto the recording medium. At that time, as soon as the ligand structure of the colored particles in the pigment dispersion combines with a metal ion present on the surface of the recording medium to form a chelate, the colored particles in the pigment dispersion rapidly coagulate. As a result, the colored particles in the pigment dispersion are strongly fixed onto the surface of the recording medium to yield an image having good rubbing/scratch resistance. In the pigment dispersion, molecules per se other than the ligand structure accelerate the fixation of the pigment onto the surface of the recording medium. The ligand structure of the colored particles in the pigment dispersion combines with the metal ion present on the surface of the recording medium to form a chelate which functions to more strongly fix the pigment onto the recording medium. However, it should noted that the above theory is merely hypothetical and the present invention is not limited to the above theory.

The amount of the monomer having a ligand structure, which can combine with a metal ion to form a chelate, is about 0.001 to 15, preferably about 0.01 to 12, in terms of molar ratio based on the polymerizable surfactant.

According to the present invention, in addition to the monomer having a ligand structure capable of combining with a metal ion to form a chelate, a monomer may be further used which, together with the polymerizable surfactant, can form a polymer. The monomer added is preferably one that can provide a pigment dispersion wherein the colored particles in the formed pigment dispersion have excellent dispersion stability in the aqueous medium to enhance the dispersion stability in the ink composition.

This monomer may be any monomer so far as the monomer is highly copolymerizable with the polymerizable surfactant. Since, however, the polymerizable surfactant represented by formula (I) is a monomer having a high electron donating property, the monomer according to the present invention preferably has a high electron accepting property. Specific examples of the monomer having a high electron accepting property include: acrylonitrile; fumaronitrile; diesters of fumaric acid, such as dibutyl fumarate; diesters of maleic acid, such as dibutyl maleate; maleimides, such as N-phenylmaleimide; and vinylidene cyanide. They may be used alone or as a mixture of two or more.

Specific examples of monomers usable herein include acrylic acid, acrylic esters, methacrylic acid, and methacrylic esters. Specific examples thereof include acrylic acid, methyl acrylate, ethyl acrylate, n-butyl acrylate, butoxyethyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, isobornyl acrylate, 2-hydroxyethyl acrylate, 2-hydroxypropyl acrylate, 2-acryloyloxyethylsuccinic acid, 2-acryloyloxyethylphthalic acid, caprolactone acrylate, glycidyl acrylate, methacrylic acid, methyl methacrylate, ethyl methacrylate, n-butyl methacrylate, 2-ethylhexyl methacrylate, butoxymethyl methacrylate, benzyl methacrylate, phenyl methacrylate, phenoxyethyl methacrylate, cyclohexyl methacrylate, dicyclopentanyl methacrylate, dicyclopentenyl methacrylate, dicyclopentenyloxyethyl methacrylate, tetrahydrofurfuryl methacrylate, isobornyl methacrylate, 2-hydroxyethyl methacrylate, 2-hydroxypropyl methacrylate, 2-hydroxybutyl methacrylate, glycerol methacrylate, 2-methacryloyloxyethylsuccinic acid, 2-methacryloyloxyethylphthalic acid, caprolactone methacrylate, glycidyl methacrylate, sulfoethyl methacrylate, butylacrylamidosulfonic acid, phosphoethyl methacrylate, ethylene glycol diacrylate, diethylene glycol diacrylate, triethylene glycol diacrylate, tetraethylene glycol diacrylate, polyethylene glycol diacrylate, allyl acrylate, bis(acryloxyethyl)hydroxyethyl isocyanurate, bis(acryloxyneopentyl glycol)azipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy)phenyl]propane, 2,2-bis[4-(acryloxyethoxy or diethoxy)phenyl]propane, 2,2-bis[4-(acryloxyethoxy or polyethoxy)phenyl]propane, hydroxypivalic acid neopentyl glycol diacrylate, 1,4-butanediol diacrylate, dicyclopentanyl diacrylate, dipentaerythritol hexaacrylate, dipentaerythritol monohydroxypentaacrylate, ditrimethylolpropane tetraacrylate, pentaerythritol triacrylate, tetrabromobisphenol A diacrylate, triglycerol diacrylate, trimethylolpropane triacrylate, tris(acryloxyethyl)isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxypropane, 2,2-bis[4-(methacryloxy)phenyl]propane, 2,2-bis[4-(methacryloxyethoxy)phenyl]propane, 2,2-bis[4-(methacryloxyethoxydiethoxy)phenyl]propane, 2,2-bis[4-(methacryloxyethoxypolyethoxy)phenyl]propane, tetrabromobisphenol A dimethacrylate, dicyclopentanyl dimethacrylate, dipentaerythritol hexamethacrylate, glycerol dimethacrylate, hydroxypivalic acid neopentyl glycol dimethacrylate, dipentaerythritol monohydroxypentamethacrylate, ditrimethylolpropane tetramethacrylate, pentaerythritol trimethacrylate, pentaerythritol tetramethacrylate, triglycerol dimethacrylate, and trimethylolpropane trimethacrylate.

The amount of the monomer, which together with the polymerizable surfactant can form a polymer, is preferably about 2 to 15 in terms of molar ratio based on the polymerizable surfactant, more preferably about 3 to 12 in terms of molar ratio based on the polymerizable surfactant. It will be apparent to a person having ordinary skill in the art that the amount of the monomer added can be determined by properly taking into consideration the amount of the monomer having a ligand structure capable of combining with a metal ion to form a chelate. The monomer described in this paragraph may be added even when the above monomer has properties equivalent to the properties of the monomer described in this paragraph.

Polymerization initiators usable in the present invention include potassium persulfate, ammonium persulfate, sodium persulfate, 2,2-azobis(2-methylpropionamidine) dihydrochloride, and 4,4-azobis(4-cyanovaleric acid).

The pigment used in the present invention is used as a colorant. The pigment is a preferred colorant from the viewpoints of lightfastness and waterfastness.

Regarding the pigment, inorganic and organic pigments are usable without particular limitation. Inorganic pigments usable herein include, in addition to titanium oxide and iron oxide, carbon blacks produced by known processes, such as contact, furnace, and thermal processes. Organic pigments usable herein include: azo pigments including azo lake, insoluble azo pigment, condensed azo pigment, and chelate azo pigment; polycyclic pigments, for example, phthalocyanine, perylene, perinone, anthraquinone, quinacridone, dioxazine, thioindigo, isoindolinone, and quinophthalone pigments; dye chelates, for example, basic dye chelates and acid dye chelates; nitro pigments; nitroso pigments; and aniline black.

Carbon blacks usable as black inks include: No. 2300, No. 900, MCF 88, No. 33, No. 40, No. 45, No. 52, MA 7, MA 8, MA 100, and No. 2200 B, which are manufactured by Mitsubishi Chemical Corporation; Raven 5750, Raven 5250, Raven 5000, Raven 3500, Raven 1255, and Raven 700, which are manufactured by Columbian Carbon Co., Ltd.; Regal 400 R, Regal 330 R, Regal 660 R, Mogul L, Monarch 700, Monarch 800, Monarch 880, Monarch 900, Monarch 1000, Monarch 1100, Monarch 1300, and Monarch 1400, which are manufactured by Cabot Corporation; and Color Black FW 1, Color Black FW 2, Color Black FW 2V, Color Black FW 18, Color Black FW 200, Color Black S 150, Color Black S 160, Color Black S 170, Printex 35, Printex U, Printex V, Printex 140 U, Special Black 6, Special Black 5, Special Black 4A, and Special Black 4, which are manufactured by Degussa.

Pigments usable in yellow inks include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185.

Pigments usable in magenta inks include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57: 1, C.I. Pigment Red 112, C.I. Pigment Red 122, C.I. Pigment Red 123, C.I. Pigment Red 168, C.I. Pigment Red 184, and C.I. Pigment Red 202.

Pigments usable in cyan inks include C.I. Pigment Blue 1, C.I. Pigment Blue 2, C.I. Pigment Blue 3, C.I. Pigment Blue 15: 3, C.I. Pigment Blue 15: 34, C.I. Pigment Blue 16, C.I. Pigment Blue 22, C.I. Pigment Blue 60, C.I. Vat Blue 4, and C.I. Vat Blue 60.

The amount of the pigment added is preferably about 5 to 50% by weight, more preferably about 5 to 30% by weight, based on the water-based pigment dispersion. The particle diameter of the pigment is preferably not more than 400 nm, more preferably not more than 200 nm.

The content of the water-based pigment dispersion is preferably about 1 to 20% by weight, more preferably about 1 to 10% by weight, based on the ink composition. When the content of the water-based pigment dispersion is not less than 1% by weight, satisfactory print density can be realized. On the other hand, when the content of the pigment dispersion is not more than 20% by weight, the ink composition has a viscosity suitable for ink jet recording, contributing to good ejection stability.

The water-based pigment dispersion according to the present invention may be produced as follows.

Specifically, the water-based pigment dispersion may be produced by immobilizing a polymerizable surfactant on a pigment, that is, by encapsulization of a pigment. More specifically, a pigment and a polymerizable surfactant are added optionally in an aqueous organic solvent and/or in water, and the mixture is dispersed and wet ground, for example, by ultrasonics, ball mill, or sand grinder. Thereafter, a monomer having a ligand structure capable of combining with a metal ion to form a chelate and a polymerization initiator are added optionally while continuing grinding, and a polymerization reaction is allowed to proceed at 40 to 100° C. for 10 to 60 hr. Thus, encapsulated pigment particles can be prepared. The amount of the polymerization initiator added is preferably 0.1 to 10% by weight, more preferably 1 to 5% by weight, based on the monomer. The encapsulated pigment particles thus obtained are then centrifuged or filtered to remove coarse particles. Water-soluble organic solvents, such as alcohols, glycols, or amides, water-soluble polymers, surfactants, fungicides and the like may be then added according to the application of the ink composition to prepare the water-based pigment dispersion according to the present invention. More preferably, the water-based pigment dispersion may be prepared according to a production process described in Japanese Patent Laid-Open No. 316909/1998.

Fine Particles of Polymer

The ink composition according to the present invention contains fine particles of a polymer. The term "fine particles of a polymer" used herein refers to fine particles of a polymer component, preferably fine particles of a polymer having a film-forming property. The term "aqueous emulsion" used herein refers to an aqueous dispersion comprising water as a continuous phase and fine particles of a polymer as dispersed particles. The "aqueous emulsion" is often called "polymer emulsion" or "resin emulsion." Specific examples of the polymer component constituting the fine particles of a polymer include acrylic resin, vinyl acetate resin, styrene/butadiene resin, vinyl chloride resin, acryl/styrene resin, butadiene resin, styrene resin, crosslinked acrylic resin, crosslinked styrene resin, benzoguanamine resin, phenolic resin, silicone resin, and epoxy resin. Regarding these resins, the form of copolymerization is not limited, and the resins may be present, for example, in the form of a block copolymer or a random copolymer.

According to the present invention, the fine particles of a polymer are preferably those of resins having a film-forming property among the above resins. The term "film-forming property" used herein means that evaporating the water component of an aqueous emulsion of the fine particles of a polymer dispersed in water results in the formation of a resin film. Likewise, the ink composition with the fine particles of a polymer added thereto has a property such that evaporating water or the aqueous organic solvent results in the formation of a resin film. This resin film functions to strongly fix the pigment component contained in the ink composition onto the surface of recording media. It is considered that this can realize images having excellent rubbing/scratch resistance and waterfastness.

According to a preferred embodiment of the present invention, the fine particles of a polymer have a minimum film-forming temperature of 30° C. or below, more preferably room temperature or below (around 25° C.), most preferably 10° C. or below. The film formation of the fine particles of a polymer at 30° C. or below is preferred, because the film formation on the printing surface proceeds automatically and the pigment is strongly fixed on recording media. The term "minimum film-forming temperature" used herein refers to a minimum temperature at which, when an aqueous emulsion prepared by dispersing fine particles of a polymer in water is thinly cast onto a sheet of a metal, such as aluminum, to form a coating which is then gradually heated, a transparent, continuous film is formed. In this case, a white powder is formed in a temperature region below the minimum film-forming temperature. Further, according to a preferred embodiment of the present invention, the fine particles of a polymer have a glass transition point of 10° C. or below.

According to a preferred embodiment of the present invention, the fine particles of a polymer have carboxyl groups on the surface thereof and, in addition, have high reactivity with a divalent metal salt. More specifically, the fine particles of a polymer have a reactivity with a divalent metal salt such that, when 3 volumes of a 0.1 wt % aqueous emulsion of the fine particles of a polymer is brought into contact with one volume of a 1 mol/liter aqueous divalent metal salt solution, the time required for the transmission of light having a wavelength of 700 nm to become 50% of the initial value is preferably not more than $1\times10^4$ sec, more preferably not more than $1\times10^3$ sec, still more preferably not more than $1\times10^2$ sec. The fine particles of a polymer, when brought into contact with divalent metal ions, are reacted with the divalent metal ions to form suspended matter which lowers the transparency of the solution. The amount of the resultant suspended matter is measured in terms of light transmission. Divalent metal ions include $Ca^{2+}$, $Cu^{2+}$, $Ni^{2+}$, $Mg^{2+}$, $Zn^{2+}$, and $Ba^{2+}$. Anions, which form salts with divalent metal ions, include $Cl^-$, $NO_3^-$, $I^-$, $Br^-$, $ClO_3^-$, and $CH_3COO^-$. This high reactivity is considered attributable to the presence of a relatively large amount of carboxyl groups on the surface of the fine particles of a polymer. Ink compositions containing fine particles of a polymer having, on the surface thereof, a large amount of carboxyl groups having high reactivity do not have any affinity for a nozzle plate, in a head for ink jet recording, which has been subjected to water repellency-imparting treatment. This can provide a great advantage that problems involved in conventional resin-containing ink compositions, that is, an ink droplet trajectory directionality problem and a failure of the ink droplets to be ejected, caused by good wettability of the nozzle plate by the ink composition, can be effectively prevented. According to a preferred embodiment of the present invention, the contact angle of an aqueous emulsion, prepared by dispersing the fine particles of a polymer in water to provide a concentration of 10% by weight, on a teflon sheet is not less than 70 degrees. Further, the surface tension of an aqueous emulsion, prepared by dispersing the fine particles of a polymer in water to provide a concentration of 35% by weight is preferably not less than $40\times10^{-3}$ N/m (40 dyne/cm, 20° C.). The utilization of such fine particles of a polymer, when the ink composition is used in ink jet recording, can more effectively prevent the ink droplet trajectory directionality problem and, at the same time, can realize good prints.

Further, the high level of hydrophilicity of the surface of the fine particles of a polymer can advantageously impart excellent storage stability to the ink composition.

According to another preferred embodiment of the present invention, the fine particles of a polymer contain 1 to 10% by weight of a structure derived from an unsaturated vinyl monomer having a carboxyl group and has a structure crosslinked by a crosslinkable monomer having two or more polymerizable double bonds with the content of the structure derived from the crosslinkable monomer being 0.2 to 4% by weight. The utilization of a three-dimensionally crosslinked polymer prepared by copolymerization of crosslinkable monomers preferably having two or more polymerizable double bonds, more preferably three or more polymerizable double bonds, makes it more difficult for the surface of the nozzle plate to be wetted by the ink composition. This can more effectively reduce the ink droplet trajectory directionality problem and, at the same time, can further improve the ejection stability.

According to the present invention, the fine particles of a polymer used may have a single-particle structure. On the other hand, according to the present invention, fine particles of a polymer having a core/shell structure may also be utilized. The core/shell structure comprises a core and a shell surrounding the core. The term "core/shell structure" used herein refers to "a form such that two or more polymers having different compositions are present in a phase separated state in a particle." Accordingly, forms of the core/shell structure usable in the present invention include a form wherein the core is entirely covered with the shell, a form wherein the core is partially covered with the shell, and a form wherein a part of the polymer constituting the shell forms a domain or the like within the core particle. Further, the particle may have a multi-layer structure of three or more layers wherein at least one additional layer having a different composition is further interposed between the core and the shell.

According to a preferred embodiment of the present invention, the core is formed of a resin having epoxy groups, and the shell is formed of a resin having carboxyl groups. The epoxy group is reactive with the carboxyl group. These two groups are allowed to exist separately from each other. That is, the epoxy group and the carboxyl group are present respectively in the core and shell, or vice versa. The reduction in the amount of water and the water-soluble organic solvent causes coalescence of the fine particles of a polymer with one another, and the fine particles of a polymer are deformed by pressure involved in the film formation. As a result, the epoxy groups in the core is bonded to the carboxyl groups in the shell to form a network structure. This can advantageously form a coating having higher strength. The amount of the unsaturated vinyl monomer having an epoxy group is preferably 1 to 10% by weight. According to the present invention, a reaction of a part of the epoxy groups with a part of the carboxyl groups before the film formation is acceptable so far as the film-forming property is not lost. In the present invention, the property such that, when reactive functional groups are allowed to coexist within the fine particles of a polymer, these groups are reacted with each other without the addition of any curing agent at the time of film formation to form a network structure, will be referred to as "self-crosslinkable."

The fine particles of a polymer may be prepared by conventional emulsion polymerization. Specifically, the fine particles of a polymer may be prepared by emulsion polymerization of an unsaturated vinyl monomer in water in the presence of a polymerization catalyst and an emulsifier.

Unsaturated vinyl monomers usable herein include those commonly used in emulsion polymerization, such as acrylic ester monomers, methacrylic ester monomers, aromatic vinyl monomers, vinyl ester monomers, vinyl cyanide compound monomers, halogenated monomers, olefin monomers, and diene monomers. Specific examples thereof include: acrylic esters, such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic esters, such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters, such as vinyl acetate; vinyl cyanide compounds, such as acrylonitrile and methacrylonitrile; halogenated monomers, such as vinylidene chloride and vinyl chloride; aromatic vinyl monomers, such as styrene, 2-methylstyrene, vinyltoluene, t-butylstyrene, chlorostyrene, vinylanisole, and vinylnaphthalene; olefins, such as ethylene, propylene, and isopropylene; dienes, such as butadiene and chloroprene; and vinyl monomers, such as vinyl ether, vinyl ketone, and vinylpyrrolidone. In the case of monomers not having a carboxyl group, an unsaturated vinyl monomer having a carboxyl group should be used. Preferred examples thereof include acrylic acid, methacrylic acid, itaconic acid, fumaric acid, and maleic acid. Among them, methacrylic acid is preferred. Emulsifiers usable herein include anionic surfactants, nonionic surfactants, and mixtures of these surfactants.

According to the present invention, a structure formed by crosslinking of molecules, derived from the above monomers, with a crosslinkable monomer having two or more polymerizable double bonds is preferred. Specific examples of crosslinkable monomers having two or more polymerizable double bonds include: diacrylate compounds, such as polyethylene glycol diacrylate, triethylene glycol diacrylate, 1,3-butylene glycol diacrylate, 1,6-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, and 2,2'-bis(4-acryloxydiethoxyphenyl)propane; triacrylate compounds, such as trimethylolpropane triacrylate, trimethylolethane triacrylate, and tetramethylolmethane triacrylate; tetraacrylate compounds, such as ditrimethylol tetraacrylate, tetramethylolmethane tetraacrylate, and pentaerythritol tetraacrylate; hexaacrylate compounds, such as dipentaerythritol hexaacrylate; dimethacrylate compounds, such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylate compounds, such as trimethylolpropane trimethacrylate and trimethylolethane trimethacrylate; methylene bisacrylamide; and divinylbenzene.

The addition of acrylamides or hydroxyl-containing monomers besides the above monomers can further improve printing stability. Specific examples of acrylamides include acrylamide and N,N'-dimethylacrylamide. Specific examples of hydroxyl-containing monomers include 2-hydroxyethyl acrylate, 2-hydroxypropyl acrylate, 2-hydroxyethyl methacrylate, and 2-hydroxypropyl methacrylate. They may be used alone or as a mixture of two or more.

The fine particles of a polymer having a core/shell structure may be produced by conventional methods, generally multi-step emulsion polymerization and the like, for example, by a method disclosed in Japanese Patent Laid-Open No. 76004/1992. Specific examples of unsaturated vinyl monomers usable in the polymerization include those described above.

Methods usable for the introduction of epoxy group into the core include a method wherein an epoxy-containing unsaturated vinyl monomer, such as glycidyl acrylate, glycidyl methacrylate, or allylglycidyl ether, is copolymerized with other unsaturated vinyl monomer, and a method wherein, in the polymerization of at least one unsaturated vinyl monomer to prepare core particles, an epoxy compound is simultaneously added to form a composite structure. The former method is preferred from the viewpoints of easiness of the polymerization, polymerization stability and the like.

Initiators, surfactants, and molecular weight regulators commonly used in emulsion polymerization, and neutralizing agents and the like may be used according to a conventional method.

According to the present invention, the fine particles of a polymer may be mixed as fine particles with other ingredients of the ink composition. Preferably, however, fine particles of a polymer are dispersed in water to prepare an aqueous emulsion, followed by mixing with other ingredients of the ink composition.

According to the present invention, conventional aqueous emulsions may also be used as the aqueous emulsion satisfying the above requirements. For example, aqueous emulsions described in Japanese Patent Publication No. 1426/1987 and Japanese Patent Laid-Open Nos. 56573/1991, 79678/1991, 160068/1991, and 18462/1992 may be used.

According to the present invention, the fine particles of a polymer may be mixed as a powder of fine particles with other ingredients of the ink composition. Preferably, however, the fine particles of a polymer are dispersed in a water medium to prepare an aqueous emulsion, followed by mixing with other ingredients of the ink composition.

The content of the fine particles of a polymer is about 0.1 to 40% by weight, preferably about 0.1 to 25% by weight, more preferably about 0.1 to 10% by weight, based on the ink composition. The diameter of the fine particles of a polymer is preferably about 10 to 400 nm, more preferably about 50 to 200 nm. The molecular weight of the fine particles of a polymer is preferably not less than 10,000, more preferably not less than 100,000.

Water, Water-soluble Organic Solvent, and Optional Ingredients

The solvent in the ink composition according to the present invention is composed mainly of water and a water-soluble organic solvent. The ink composition according to the present invention may contain optional ingredients.

According to a preferred embodiment of the present invention, the ink composition according to the present invention contains a water-soluble organic solvent. Specific examples of water-soluble organic solvents include: alkyl alcohols having 1 to 4 carbon atoms, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t- butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether; formamide; acetamide; dimethyl sulfoxide; sorbit; sorbitan; acetin; diacetin; triacetin; and sulfolane.

According to a preferred embodiment of the present invention, among the water-soluble organic solvents, those having a boiling point of 180° C. or above are used. The use of water-soluble organic solvents having a boiling point of 180° C. or above can impart water retention and wetting properties to the ink composition. As a result, storage of the ink composition for a long period of time neither causes coagulation of pigment nor an increase in the viscosity of the ink composition. Thus, excellent storage stability can be realized. Further, an ink composition can be realized which, even when allowed to stand in an open state, that is, when allowed to stand in contact with air at room temperature, can maintain the fluidity and the redispersibility for a long period of time, and, in addition, does not cause clogging of nozzles during printing or at the time of restarting after interruption of printing, thus offering high ejection stability.

Specific examples of water-soluble organic solvents having a boiling point of 180° C. or above include ethylene glycol (b.p.: 197° C.; the boiling point being hereinafter described within parentheses), propylene glycol (187° C.), diethylene glycol (245° C.), pentamethylene glycol (242° C.), trimethylene glycol (214° C.), 2-butene-1,4-diol (235° C.), 2-ethyl-1,3-hexanediol (243° C.), 2-methyl-2,4-pentanediol (197° C.), 1-methyl-2-pyrrolidone (202° C.), 1,3-dimethyl-2-imidazolidinone (257–260° C.), 2-pyrrolidone (245° C.), glycerin (290° C.), tripropylene glycol monomethyl ether (243° C.), dipropylene glycol monoethyl glycol (198° C.), dipropylene glycol monomethyl ether (190° C.), dipropylene glycol (232° C.), triethylene glycol monomethyl ether (249° C.), tetraethylene glycol (327° C.), triethylene glycol (288° C.), diethylene glycol monobutyl ether (230° C.), diethylene glycol monoethyl ether (202° C.), and diethylene glycol monomethyl ether (194° C.). They may be used alone or as a mixture of two or more. According to the present invention, among the water-soluble organic solvents, those having a boiling point of 200° C. or above are more preferred.

The content of the water-soluble organic solvent is preferably about 10 to 40% by weight, more preferably 10 to 20% by weight.

According to a preferred embodiment of the present invention, the ink composition according to the present invention contains a saccharide, a tertiary amine, or an alkali hydroxide. The addition of the saccharide and the tertiary amine can impart wetting properties. In particular, the addition of the saccharide can impart, to the ink composition, the effect of maintaining water retention and wetting properties for a long period of time, and thus can realize an ink composition which, when stored for a long period of time, causes neither coagulation of pigment nor an increase in viscosity of the ink composition, that is, has excellent storage stability. Further, the addition of the saccharide can impart, to the ink composition, the effect of maintaining, for a long period of time, fluidity and redispersibility even when the ink composition is allowed to stand in an open state, that is, is allowed to stand in contact with air at room temperature. Furthermore, the addition of the saccharide can prevent nozzle clogging during printing or at the time of restarting after printing, thus offering high ejection stability. The addition of the tertiary amine and the alkali hydroxide brings about stable dispersion of the pigment and the fine particles of a polymer in the ink composition. However, it should be noted that the above theory is merely hypothetical and should not be construed as limiting the scope of the present invention.

Specific examples of saccharides usable herein include monosaccharides, disaccharides, oligosaccharides, including trisaccharides and tetrasaccharides, and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharides" used herein means saccharides in the broad sense as including substances which exist widely in the world of nature, such as alginic acid, α-cyclodextrin, and cellulose. Derivatives of these saccharides usable herein include reducing sugars of the above saccharides, for example, sugar alcohols represented by the general formula $HOCH_2(CHOH)_nCH_2OH$, wherein n is an integer of 2 to 5, oxidizing sugars, for example, aldonic acid or uronic acid, amino acids, and thiosugars. Among them, sugar alcohols are particularly preferred, and specific examples thereof include maltitol and sorbitol. The content of the saccharide is preferably about 0.1 to 40% by weight, more preferably about 1 to 30% by weight, based on the ink composition.

Specific examples of tertiary amines include trimethylamine, triethylamine, triethanolamine, dimethylethanolamine, diethylethanolamine, triisopropenolamine, and butyldiethanolamine. They may be used alone or as a mixture of two or more. The amount of the tertiary amine added to the ink composition is preferably about 0.1 to 10% by weight, more preferably about 0.5 to 5% by weight.

Specific examples of alkali hydroxides include potassium hydroxide, sodium hydroxide, and lithium hydroxide, and the amount of the alkali hydroxide added to the ink composition is preferably about 0.01 to 5% by weight, more preferably about 0.05 to 3% by weight.

The ink composition according to the present invention may further comprise a surfactant. Specific examples of surfactants usable herein include: anionic surfactants, for example, sodium dodecylbenzenesulfonate, sodium laurylate, and an ammonium salt of polyoxyethylene alkyl ether sulfates; nonionic surfactants, for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides; and acetylene glycol. They may be used alone or in combination of two or more.

Preferably, the ink composition according to the present invention further contains a glycol ether and/or an acetylene glycol surfactant. Glycol ethers include ethylene glycol monomethyl ether, ethylene glycol monoethyl ether, ethylene glycol monobutyl ether, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, and dipropylene glycol mono-n-butyl ether.

Specific examples of preferred acetylene glycol surfactants usable in the present invention include compounds represented by formula (VI):

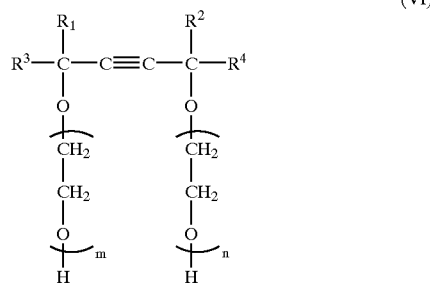

wherein $0 \leq m+n \leq 50$ and $R^1$, $R^2$, $R^3$, and $R^4$ each independently represent an alkyl group, preferably a straight-chain or branched alkyl group having 6 or less carbon atoms.

Among the compounds represented by formula (VI), particularly preferred compounds include 2,4,7,9-tetramethyl-5-decyne-4,7-diol, 3,6-dimethyl-4-octyne-3,6-diol, and 3,5-dimethyl-1-hexyn-3-ol. Commercially available products may also be used as the acetylene glycol surfactant represented by the formula (VI). Specific examples thereof include Surfynol 104, Surfynol 82, Surfynol 465, Surfynol 485, and Surfynol TG (all the above products being available from Air Products and Chemicals Inc.) and OLFINE STG and OLFINE E 1010 (tradenames: manufactured by Nissin Chemical Industry Co., Ltd.).

The amount of the surfactant added is preferably 0.01 to 10% by weight, more preferably 0.1 to 5% by weight, based on the ink composition.

If necessary, the ink compositions may further contain pH adjustors, preservatives, fungicides, etc. from the viewpoint of improving the storage stability.

Ink Set

The ink composition according to the present invention may be used with other ink composition(s) to perform image recording. Other ink compositions include black, cyan, magenta, and yellow ink compositions. Thus, according to another aspect of the present invention, there is provided an ink set for ink jet recording, comprising the above ink composition and other ink composition(s). These other ink compositions may be the ink composition according to the present invention or alternatively may be an ink composition produced by other production process. For other ink compositions, the colorant and other composition may be properly determined by taking a printing method into consideration. Printing of a combination of these ink compositions to form images can realize images possessing excellent fast drying properties and rubbing/scratch resistance.

Ink Jet Recording Method

According to still another aspect of the present invention, there is provided an ink jet recording method comprising the step of depositing a reaction solution and an ink composition onto a recording medium to perform printing.

According to the ink jet recording method of the present invention, contact of the reaction solution with the ink composition can realize good prints. Although the mechanism through which good prints can be realized has not been elucidated yet, the mechanism is believed to be as follows. Upon contact of the reaction solution with the ink composition, the reactant contained in the reaction solution breaks the state of dispersion of the colored particles in the water-based pigment dispersion, the fine particles of a polymer, or other ingredients in the ink composition. This is considered to result in coagulation thereof. The coagulate is considered to inhibit the penetration of pigment into the recording medium and to strongly fix the pigment onto the recording medium. In particular, according to the present invention, the ink composition comprises the colored particles in the water-based pigment dispersion, produced from a monomer having a ligand structure capable of combining with a metal ion to form a chelate, and the fine particles of a polymer having specific properties. This is considered to further accelerate the formation of the coagulate, and consequently can improve the fixation of the pigment and the fast drying properties on recording media and can realize good prints. The above mechanism is merely hypothetical, and should not be construed as limiting the scope of the present invention.

The reaction solution and the ink composition may be applied onto the recording medium in any order. Specifically, suitable methods for the deposition of the reaction solution and the ink composition include a method wherein the ink composition is deposited onto the recording medium after the deposition of the reaction solution onto the recording medium, a method wherein the ink composition is first printed onto the recording medium followed by the deposition of the reaction solution onto the recording medium, and a method wherein the reaction solution and the ink composition are mixed together just before or just after the ejection.

The deposition of the reaction solution onto the recording medium may be carried out by any of a method wherein the reaction solution is selectively deposited onto only an area where the ink composition is deposited, and a method wherein the reaction solution is deposited on the whole area of the recording medium. The former method is cost-effective because the consumption of the reaction solution can be minimized. In this method, however, the accuracy of the position at which both the reaction solution and the ink composition are deposited should be high to some extent. On the other hand, in the latter method, as compared with the former method, the requirement for the accuracy of the position where the reaction solution and the ink composition are deposited is relaxed. In the latter method, however, a larger amount of the reaction solution should be deposited on the whole area of the recording medium. This is often causative of curling of papers upon drying. For this reason, the method to be used may be determined by taking a combination of the ink composition with the reaction solution into consideration. When the former method is adopted, the reaction solution may be deposited by ink jet recording.

Reaction Solution

The reaction solution used in the present invention contains a reactant. The reactant can break the state of dispersion of pigment particles of the water-based pigment dispersion and/or fine particles of a polymer or the like of the polymer emulsion in the ink composition to cause coagulation. Specific examples of reactants usable herein include metal salts.

The metal salt usable in the reaction solution is a metal salt that is constituted by divalent or higher polyvalent metal ions and anions bonded to the polyvalent metal ions and is soluble in water. Specific examples of polyvalent metal ions include divalent metal ions, such as $Ca^{2+}$, $Cu^{2+}$, $Ni^{2+}$, $Mg^{2+}$, $Zn^{2+}$, and $Ba^{2+}$, and trivalent metal ions, such as $Al^{3+}$, $Fe^{3+}$, and $Cr^{3+}$. Anions include $Cl^-$, $NO^{3-}$, $I^-$, $Br^-$, $ClO^{3-}$, and $CH_3COO^{31}$.

Especially, a metal salt constituted by $Ca^{2+}$ or $Mg^{2+}$ provides favorable results in terms of pH of the reaction solution and the quality of prints.

The concentration of the polyvalent metal salt in the reaction solution may be suitably determined so as to attain the effect of providing good print quality and preventing clogging. It, however, is preferably about 0.1 to 40% by weight, more preferably about 5 to 25% by weight.

According to a preferred embodiment of the present invention, the polyvalent metal salt contained in the reaction solution is constituted by divalent or higher polyvalent metal ions and nitrate ions or carboxylate ions bonded to the polyvalent metal ions and is soluble in water.

In this case, preferably, the carboxylate ions are derived from a saturated aliphatic monocarboxylic acid having 1 to 6 carbon atoms or a carbocyclic monocarboxylic acid having 7 to 11 carbon atoms. Specific examples of preferred saturated aliphatic monocarboxylic acids having 1 to 6 carbon atoms include formic acid, acetic acid, propionic acid, butyric acid, isobutyric acid, valeric acid, isovaleric acid, pivalic acid, and hexanoic acid. Among them, formic acid and acetic acid are particularly preferred.

A hydrogen atom(s) on the saturated aliphatic hydrocarbon group in the monocarboxylic acid may be substituted by a hydroxyl group. Specific examples of preferred substituted carboxylic acids include lactic acid.

Specific examples of preferred carbocyclic monocarboxylic acids having 6 to 10 carbon atoms include benzoic acid and naphthoic acid with benzoic acid being more preferred.

According to a preferred embodiment of the present invention, the reaction solution further contains a polyol in addition to the polyvalent metal salt. The polyol has a vapor pressure of not more than 0.01 mmHg at 20° C., and the amount of the polyol added is such that the weight ratio of the polyol to the polyvalent metal salt is not less than 1, preferably 1.0 to 5.0. Further, according to a preferred embodiment of the present invention, the amount of the polyol added is not less than 10% by weight, more preferably about 10 to 30% by weight, based on the reaction solution.

Specific examples of preferred polyols usable herein include polyhydric alcohols, for example, glycerin, diethylene glycol, triethylene glycol, 1,5-pentanediol, and 1,4-butanediol. Further specific examples of preferred polyols include saccharides, for example, monosaccharides, disaccharides, oligosaccharides including trisaccharides and tetrasaccharides, and other polysaccharides, preferably glucose, mannose, fructose, ribose, xylose, arabinose, galactose, aldonic acid, glucitol, sorbitol, maltose, cellobiose, lactose, sucrose, trehalose, and maltotriose.

These polyols may be added alone or as a mixture of two or more. When the polyols are added as a mixture of two or more, the amount of these polyols added is such that the weight ratio of the total amount of the polyols to the polyvalent metal salt is not less than 1.

According to a preferred embodiment of the present invention, the reaction solution comprises a wetting agent comprising a high-boiling organic solvent. The high-boiling organic solvent functions to prevent the reaction solution from drying out. Specific examples of preferred high-boiling organic solvents usable herein, some of which are described above in connection with the polyol, include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine. According to a preferred embodiment of the present invention, the reaction solution contains triethylene glycol monobutyl ether and glycerin in combination.

Although the amount of the high-boiling organic solvent added is not particularly limited, it is preferably about 0.5 to 40% by weight, more preferably about 2 to 20% by weight, based on the reaction solution.

According to a preferred embodiment of the present invention, the reaction solution further contains a low-boiling organic solvent. Specific examples of preferred low-boiling organic solvents usable herein include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time required for drying the ink composition. The amount of the low-boiling organic solvent added is preferably 0.5 to 10% by weight, more preferably 1.5 to 6% by weight, based on the reaction solution.

According to a preferred embodiment of the present invention, the reaction solution further contains a penetrating agent. Penetrating agents usable herein include various surfactants, such as anionic, cationic, and amphoteric surfactants; alcohols, such as methanol, ethanol, and iso-propyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether.

More preferred penetrating agents usable in the present invention are compounds represented by formula (VI) and/or lower alcohol ethers of polyhydric alcohols.

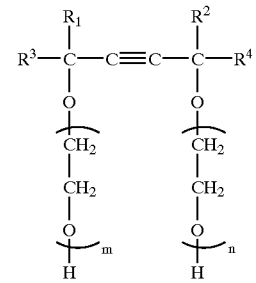

(VI)

wherein $0 \leq m+n \leq 50$ and $R^1$, $R^2$, $R^3$, and $R^4$ each independently represent an alkyl group, preferably a straight-chain or branched alkyl group having not more than 6 carbon atoms.

Among the compounds represented by formula (VI), particularly preferred compounds include 2,4,7,9-tetramethyl-5-decyne-4,7-diol, 3,6-dimethyl-4-octyne-3,6-diol, and 3,5-dimethyl-1-hexyn-3-ol. Commercially available products may also be used as the acetylene glycol surfactant represented by formula (VI). Specific examples thereof include Surfynol 104, Surfynol 82, Surfynol 465, Surfynol 485, and Surfynol TG (all the above products being available from Air Products and Chemicals Inc.) and OLFINE STG and OLFINE E 1010 (tradenames: manufactured by Nissin Chemical Industry Co., Ltd.).

According to a preferred embodiment of the present invention, the reaction solution contains triethanolamine for pH adjustment purposes. The amount of the triethanolamine added is preferably about 0 to 2.0% by weight.

Ink Composition

The ink composition as described above in 20 connection with one aspect of the present invention may be used in the recording method according to the present invention. The composition, preparation and the like may be substantially the same as those described above.

Ink Jet Recording Apparatus

A recording apparatus for carrying out the recording method according to the present invention will be described with reference to the accompanying drawings.

FIG. 1 is a diagram showing an embodiment of an ink jet recording apparatus. In this embodiment, an ink composition and a reaction solution are accommodated in a tank and fed into a recording head through an ink tube. Specifically, a recording head 1 is communicated with an ink tank 2 through an ink tube 3. In this case, the interior of the ink tank 2 is partitioned, and a chamber for an ink composition, optionally a plurality of chambers respectively for a plurality of color ink compositions, and a chamber for a reaction solution are provided.

The recording head 1 is moved along a carriage 4 by means of a timing belt 6 driven by a motor 5. On the other hand, a recording medium 7 is placed by a platen 8 and a guide 9 at a position facing the recording head 1. In this embodiment, a cap 10 is provided. A suction pump 11 is connected to the cap 10 in order to conduct the so-called "cleaning operation." The ink composition sucked by the suction pump 11 is resorvoired in a waste ink tank 13 through a tube 12.

Figure 2:
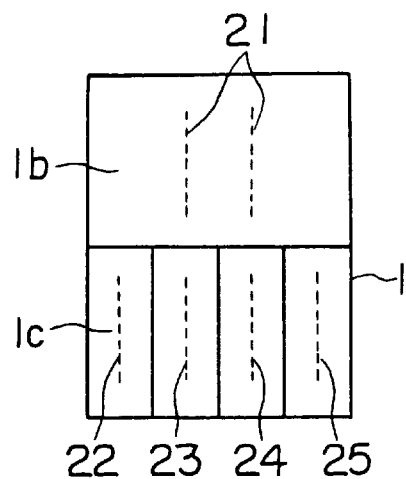
FIG. 2 is an enlarged view showing a nozzle face of a recording head, wherein 1b designates a nozzle face for a reaction solution and 1c a nozzle face for ink compositions.

FIG. 2 is an enlarged view showing the surface of nozzles for the recording head 1. In the drawing, the surface of a nozzle for a reaction solution is indicated by 1b, and a nozzle 21 for ejecting the reaction solution is provided in the longitudinal direction. On the other hand, the surface of nozzles for the ink composition is indicated by 1c, and a yellow ink composition, a magenta ink composition, a cyan ink composition, and a black ink composition are ejected respectively through nozzles 22, 23, 24, and 25.

Figure 3:
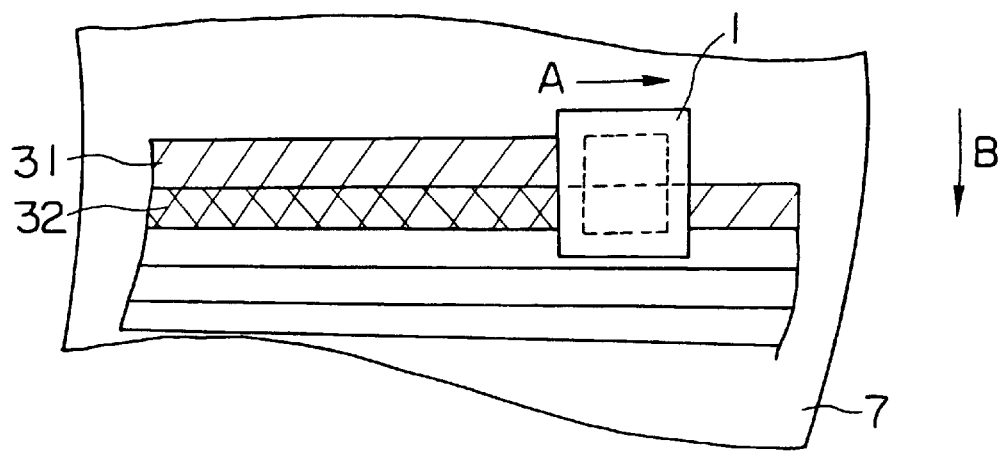
FIG. 3 is a diagram illustrating ink jet recording using the recording head shown in FIG. 2, wherein numeral 31 designates a reaction solution-deposited region and numeral 32 a printed region where an ink composition has been printed on a reaction solution-deposited portion.

Further, an ink jet recording method using the recording head shown in FIG. 2 will be described with reference to FIG. 3. The recording head 1 is moved in the direction indicated by an arrow A, during which time the reaction solution is ejected through the nozzle surface 1b to form a reaction solution-deposited region 31 in a band form on the recording medium 7. Subsequently, the recording medium 7 is transferred by a predetermined extent in the recording medium feed direction indicated by an arrow B, during which time the recording head 1 is moved in the direction opposite to that indicated by the arrow A in the drawing and returned to the left end of the recording medium 7, and the recording head 1 conducts printing using the ink composition on the reaction solution-deposited region, thereby forming a print region 32.

Figure 4:
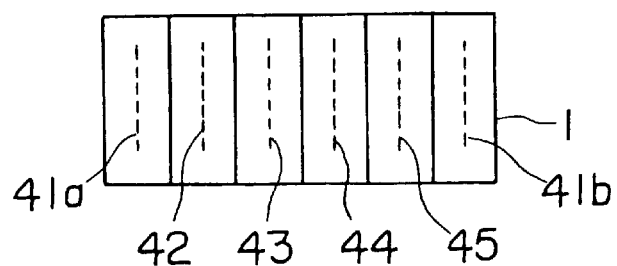
FIG. 4 is a diagram showing another embodiment of the recording head usable in practicing the present invention, wherein all ejection nozzles are arranged in the lateral direction.

Further, as shown in FIG. 4, in the recording head 1, it is also possible to arrange all nozzles in the lateral direction to construct a nozzle assembly. In the drawing, ejection nozzles for a reaction solution are denoted by 41a and 41b, and a yellow ink composition, a magenta ink composition, a cyan ink composition, and a black ink composition are ejected respectively through nozzles 42, 43, 44, and 45. In the recording head according to this embodiment, the recording head 1, when reciprocated on the carriage, can conduct printing in both directions. Therefore, in this case, printing at a higher speed can be expected as compared with the case where the recording head shown in FIG. 2 is used.

Regulating the surface tension of the reaction solution and the ink composition preferably by the above method enables a high-quality print to be more stably provided independently of the order of depositing the reaction solution and the ink composition. In this case, the use of only one ejection nozzle for the reaction solution suffices for desired results (for example, the nozzle indicated by numeral 41b in the drawing may be omitted), leading to a further reduction in size of head and an increase in printing speed.

In the ink jet recording apparatus, the supplement of the ink composition may be carried out by replacing a cartridge as an ink tank. The ink tank may be integral with the recording head.

Figure 5:
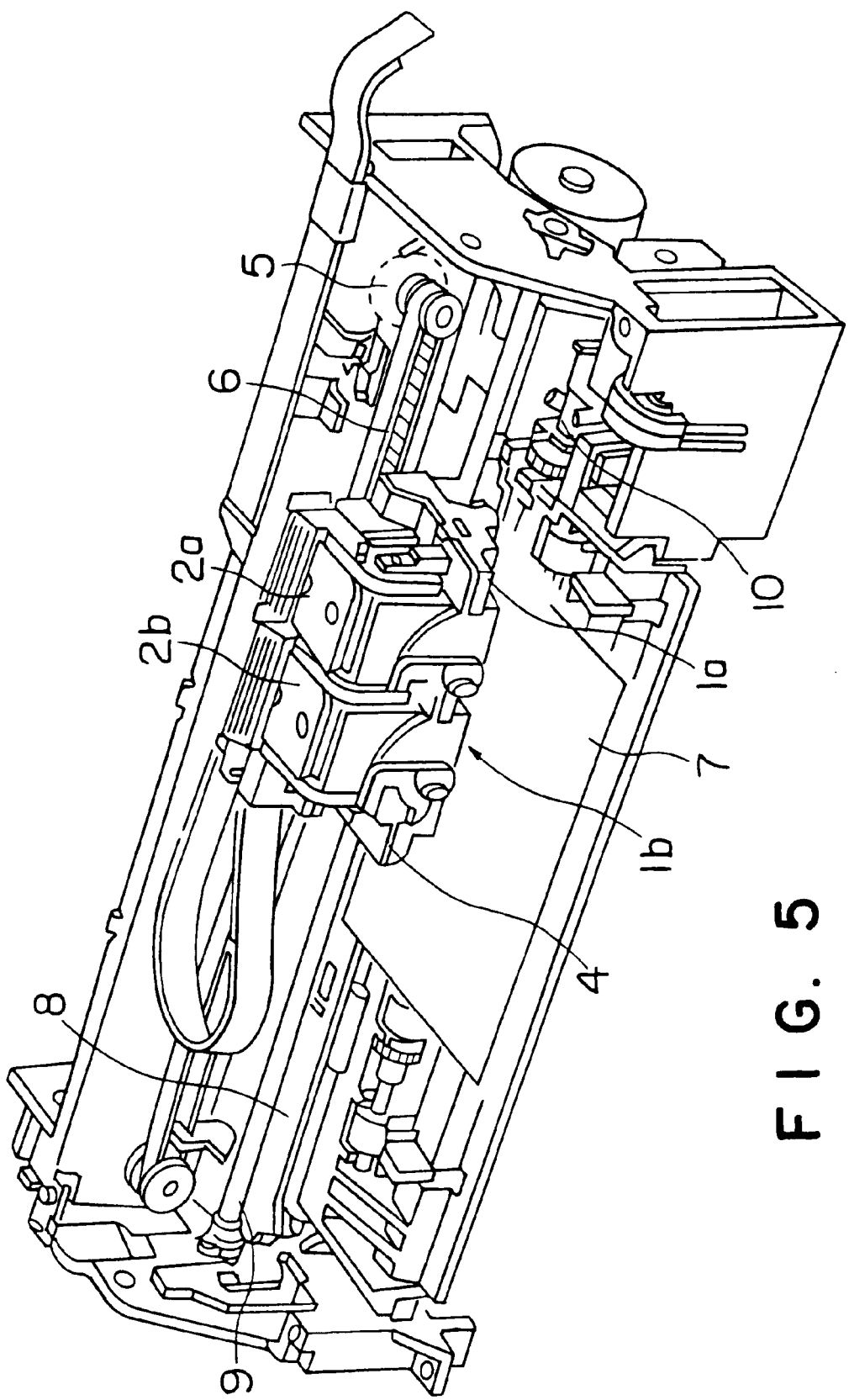
FIG. 5 is a diagram showing another embodiment of the ink jet recording apparatus according to the present invention, wherein a recording head is integral with an ink tank.

A preferred embodiment of an ink jet recording apparatus using such an ink tank is shown in FIG. 5. In the drawing, the same members as used in the apparatus shown in FIG. 1 have the same reference numerals. In the embodiment shown in FIG. 5, recording heads 1a and 1b are integral respectively with ink tanks 2a and 2b. An ink composition and a reaction solution are ejected respectively through the recording heads 1a and 1b. Basically, printing may be conducted in the same manner as described above in connection with the apparatus shown in FIG. 1. Further, in this embodiment, the recording head 1a sis moved together with the ink tank 2a on a carriage 4, while the recording head 1b is moved together with the ink tank 2b on the carriage 4.

EXAMPLES

The present invention will be described in more detail with reference to the following examples, though it is not limited to these examples only.

Preparation of Pigment Dispersions

Dispersion 1 of Pigment

Dispersion 1 of pigment was prepared in the same manner as described in Example 1 of Japanese Patent Laid-Open No. 316909/1998. Specifically, a reaction vessel equipped with an ultrasonic generator, a stirrer, and a temperature controller was charged with 50 g of carbon black, 30 g of a polymerizable surfactant represented by formula (II) described in the above publication, and 800 g of ion-exchanged water. Ultrasonic waves were applied to the mixture in the reaction vessel for 4 hr to comminute the mixture. Next, 16 g of acrylonitrile and 0.5 g of potassium persulfate were further added to the reaction vessel, and a polymerization reaction was allowed to proceed at 60° C. for 48 hr. The desired product thus obtained was filtered through a 0.4-$\mu$m filter to remove coarse particles. Thus, the dispersion of pigment was prepared. Adeka Reasoap SE-10N (number of moles of ethylene oxide added 10, purity 100%, manufactured by Asahi Denka Kogyo Ltd.) was used as the polymerizable surfactant represented by formula (II) described in Japanese Patent Laid-Open No. 316909/1998.

Dispersion 2 of Pigment

Carbon black (100 g) and 60 g of a polymerizable surfactant SE-10N manufactured by Asahi Denka Kogyo Ltd. were added to 800 g of ion-exchanged water. Ultrasonic waves generated by an ultrasonic generator were applied to the mixture for 2 hr, followed by dispersion in a sand mill (manufactured by Yasukawa Seisakusho) for additional about 2 hr. The dispersion was introduced into a reaction vessel equipped with an ultrasonic generator, a stirrer, a temperature controller, a reflux condenser, and a dropping funnel. Subsequently, an emulsion previously prepared by mixing 10 g of benzyl methacrylate, 20 g of butyl methacrylate, 5 g of methacryloyl diacetylmethane, 5 g of 2-acrylamido-2-methylpropanesulfonic acid, 1 g of the polymerizable surfactant SE-10N described above, 0.5 g of potassium persulfate, and 100 g of ion-exchanged water together was gradually added dropwise to the reaction vessel through the dropping funnel. After the completion of the dropwise addition, a polymerization reaction was allowed to proceed at 60° C. for 48 hr. The dispersion of the colorant thus obtained was adjusted to around pH 8 by the addition of potassium hydroxide, and then passed through a 0.4-μm filter to remove coarse particles. Thus, the dispersion 2 of pigment having a colorant concentration of 18% was prepared.

Dispersion of Magenta Pigment

C.I. Pigment Red 122 (100 g) and 60 g of a polymerizable surfactant SE-10N manufactured by Asahi Denka Kogyo Ltd. were added to 800 g of ion-exchanged water. Ultrasonic waves generated by an ultrasonic generator were applied to the mixture for 2 hr, followed by dispersion in a sand mill, manufactured by Yasukawa Seisakusho, for additional about 2 hr. The dispersion was introduced into a reaction vessel equipped with an ultrasonic generator, a stirrer, a temperature controller, a reflux condenser, and a dropping funnel. Subsequently, an emulsion previously prepared by mixing 10 g of benzyl methacrylate, 10 g of butyl methacrylate, 2 g of dicyclopentanyl methacrylate, 10 g of acryloyl acetyl acetone, 10 g of acrylamide, 1 g of the polymerizable surfactant SE-10N described above, 0.5 g of potassium persulfate, and 100 g of ion-exchanged water together was gradually added dropwise to the reaction vessel through the dropping funnel. After the completion of the dropwise addition, a polymerization reaction was allowed to proceed at 60° C. for 48 hr. The dispersion of the colorant thus obtained was adjusted to around pH 8 by the addition of potassium hydroxide, and then passed through a 0.4-μm filter to remove coarse particles. Thus, the dispersion of a magenta pigment having a colorant concentration of 18% was prepared.

Dispersion of Cyan Pigment

C.I. Pigment Blue 15: 3 (50 g) and 30 g of a polymerizable surfactant SE-10N manufactured by Asahi Denka Kogyo Ltd. were added to 500 g of ion-exchanged water. Ultrasonic waves generated by an ultrasonic generator were applied to the mixture for 2 hr, followed by dispersion in a sand mill, manufactured by Yasukawa Seisakusho, for additional about 2 hr. The dispersion was introduced into a reaction vessel equipped with an ultrasonic generator, a stirrer, a temperature controller, a reflux condenser, and a dropping funnel. Subsequently, an emulsion previously prepared by mixing 5 g of diethyl methacryloylmalonate, 5 g of 2-acrylamido-2-methylpropanesulfonic acid, 9 g of acrylonitrile, 1 g of the polymerizable surfactant SE-10N described above, 0.5 g of potassium persulfate, and 100 g of ion-exchanged water together was gradually added dropwise to the reaction vessel through the dropping funnel. After the completion of the dropwise addition, a polymerization reaction was allowed to proceed at 60° C. for 48 hr. The dispersion of the colorant thus obtained was adjusted to around pH 8 by the addition of potassium hydroxide, and then passed through a 0.4-μm filter to remove coarse particles. Thus, the dispersion of a cyan pigment having a colorant concentration of 16% was prepared.

Dispersion of Yellow Pigment

C.I. Pigment Yellow 185 (100 g) and 60 g of a polymerizable surfactant SE-10N manufactured by Asahi Denka Kogyo Ltd. were added to 800 g of ion-exchanged water. Ultrasonic waves generated by an ultrasonic generator were applied to the mixture for 2 hr, followed by dispersion in a sand mill, manufactured by Yasukawa Seisakusho, for additional about 2 hr. The dispersion was introduced into a reaction vessel equipped with an ultrasonic generator, a stirrer, a temperature controller, a reflux condenser, and a dropping funnel. Subsequently, an emulsion previously prepared by mixing 10 g of benzyl methacrylate, 15 g of butyl methacrylate, 5 g of 2-(methacryloxy)ethyl acetate, 2 g of dicyclopentanyl dimethacrylate, 10 g of 2-acrylamido-2-methylpropanesulfonic acid, 5 g of acrylamide, 1 g of the polymerizable surfactant SE-10N described above, 0.5 g of potassium persulfate, and 100 g of ion-exchanged water together was gradually added dropwise to the reaction vessel through the dropping funnel. After the completion of the dropwise addition, a polymerization reaction was allowed to proceed at 60° C. for 48 hr. The dispersion of the colorant thus obtained was adjusted to pH 8 by the addition of potassium hydroxide, and then passed through a 0.4-μm filter to remove coarse particles. Thus, the dispersion of a yellow pigment having a colorant concentration of 18% was prepared.

Preparation of Fine Particles of Polymer

Preparation of Fine Particles 1 of Polymer

A reaction vessel equipped with a stirrer, a thermometer, a reflux condenser, and a dropping device was charged with 0.5 g of potassium persulfate and 80 g of pure water to prepare a solution. The reaction vessel was heated to raise the internal temperature to 70° C. Separately, 40 g of styrene, 45 g of butyl acrylate, 5 g of methacrylic acid, 1 g of 2-hydroxyethyl acrylate, 1 g of 1,6-hexanediol dimethacrylate, 1 g of sodium laurylsulfate, and 40 g of pure water were mixed with stirring to prepare an emulsion. The emulsion was gradually added dropwise to the reaction vessel through the dropping funnel over a period of 3 hr to perform a polymerization reaction. The aqueous emulsion thus obtained comprised fine particles of a polymer which had a structure derived from an unsaturated vinyl monomer having a carboxyl group and a structure crosslinked by a crosslinkable monomer having two polymerizable double bonds, and had a minimum film-forming temperature of about 20° C. and an average particle diameter of 150 nm. The average particle diameter of the fine particles of the polymer was measured with MICROTRACK D.H.S. DPA manufactured by MOONTECH. The average particle diameter of the fine particles of polymer prepared below was also measured with this apparatus.

Preparation of Fine Particles 2 of Polymer

A reaction vessel equipped with a stirrer, a thermometer, a ref lux condenser, and a dropping device was charged with 900 g of pure water and 4 g of sodium laurylsulfate. The internal temperature of the reaction vessel was raised to 70° C. under stirring while replacing the air in the reaction vessel by nitrogen. While maintaining the internal temperature of the reaction vessel at 70° C., 2 g of potassium persulfate as a polymerization initiator was added to and dissolved in the system. An emulsion previously prepared by adding 450 g of pure water, 3 g of sodium laurylsulfate, 20 g of acrylamide, 435 g of styrene, 475 g of butyl acrylate, 30 g of methacrylic acid, and 2 g of ethylene glycol dimethacrylate with stirring was then continuously added dropwise to the reaction vessel over a period of 3 hr. After the completion of the dropwise addition, aging was carried out for 3 hr. The aqueous emulsion thus obtained was cooled to room temperature, adjusted to solid content 35% by weight and pH 8 by the addition of pure water and aqueous ammonia.

The aqueous emulsion thus obtained comprised fine particles of a polymer which had a structure derived from an unsaturated vinyl monomer having a carboxyl group and a structure crosslinked by a crosslinkable monomer having two polymerizable double bonds, and had a minimum film-forming temperature of 22° C., a surface tension of $59 \times 10^{-3}$ N/m (59 dyn/cm), a contact angle of 113°, an average particle diameter of 80 nm, and a half value period in a reaction with $Mg^{2+}$ ions of 5 sec. The surface tension of the fine particles of a polymer was measured with an automatic tensiometer model CBVP-Z manufactured by Kyowa Interface Science Co., Ltd. The surface tension of the fine particles of a polymer prepared below was also measured with this apparatus.

Preparation of Fine Particles 3 of Polymer

A reaction vessel equipped with a stirrer, a thermometer, a ref lux condenser, and a dropping device was charged with 300 g of pure water and 1 g of sodium dodecylbenzenesulfonate. 2.3 g of potassium persulfate was added to the system at a temperature of 70° C. in a nitrogen atmosphere with stirring. On the other hand, two-phase emulsion monomers having the following compositions were separately provided. Specifically, a mixture of 36 g of pure water, 0.2 g of sodium dodecylbenzenesulfonate, 38.6 g of styrene, 28.9 g of butyl acrylate, 1 g of diethylene glycol dimethacrylate, and 0.1 g of t-dodecylmercaptan was provided as the first phase. A mixture of 72 g of pure water, 0.4 g of sodium dodecylbenzenesulfonate, 57.6 g of styrene, 108.9 g of butyl acrylate, 5 g of methacrylic acid, and 0.2 g of t-dodecylmercaptan was provided as the second phase. Next, the emulsion monomer as the first phase was added dropwise to the above aqueous solution, followed by digestion. Further, the emulsion monomer as the second phase was added dropwise thereto, followed by digestion. The dropping time was 3 hr for the first phase, and 2 hr for the second phase, and, for each phase, the digestion time was 2 hr.

The aqueous emulsion thus obtained was cooled to room temperature, and pure water and aqueous ammonia were then added thereto to adjust the aqueous emulsion to solid content 35% and pH 8.

The aqueous emulsion thus obtained comprised the fine particles of a polymer having a core/shell structure. The fine particles of a polymer had a structure derived from an unsaturated vinyl monomer having a carboxyl group and a structure crosslinked by a crosslinkable monomer having two polymerizable double bonds, and had a minimum film-forming temperature of 24° C., a surface tension of $57 \times 10^{-3}$ N/m (57 dyn/cm), a contact angle of 90 degrees, an average particle diameter of 150 nm, and a half value period in a reaction with $Mg^{2+}$ ions of 70 sec.

Preparation of Fine Particles 4 of Polymer

A reaction vessel equipped with a stirrer, a thermometer, a reflux condenser, and a dropping device was charged with 900 g of pure water. The internal temperature of the reaction vessel was raised to 70° C. under stirring while replacing the air in the reaction vessel by nitrogen. While maintaining the internal temperature of the reaction vessel at 70° C., 2 g of potassium persulfate as a polymerization initiator was added to and dissolved in the system. An emulsion previously prepared by adding 70 g of pure water, 1 g of sodium laurylsulfate, 53 g of styrene, 59 g of butyl acrylate, 48 g of glycidyl methacrylate, and 0.16 of t-dodecylmercaptan as a molecular weight modifier with stirring was then continuously added dropwise to the reaction vessel over a period of one hr. After the completion of the dropwise addition, aging was carried out for one hr.

Subsequently, an emulsion previously prepared by adding 70 g of pure water, 1 g of sodium laurylsulfate, 1 g of acrylamide, 79 g of styrene, 80 g of butyl acrylate, and 0.16 g of t-dodecylmercaptan with stirring was continuously added dropwise to the reaction vessel over a period of one hr. After the completion of the dropwise addition, aging was carried out for one hr.

Next, an aqueous solution of 2 g of ammonium persulfate as a polymerization initiator dissolved in 20 g of pure water was added to the reaction vessel. Further, an emulsion previously prepared by adding 300 g of pure water, 2 g of sodium laurylsulfate, 16 g of acrylamide, 298 g of styrene, 297 g of butyl acrylate, 29 g of methacrylic acid, 10 g of ethylene glycol dimethacrylate, and 0.65 g of t-dodecylmercaptan with stirring was continuously added dropwise to the reaction vessel over a period of 3 hr. After the completion of the dropwise addition, aging was carried out for 3 hr.

The aqueous emulsion thus obtained was cooled to room temperature, adjusted to solid content 35% by weight and pH 8 by the addition of pure water and aqueous ammonia.

For the aqueous emulsion thus obtained, the fine particles of a polymer had a core/shell structure comprising a core formed of an epoxy-containing resin and a shell formed of a carboxyl-containing resin, were self-crosslinkable, and had a minimum film-forming temperature of 24° C., a surface tension of $58 \times 10^{-3}$ N/m (58 dyn/cm), a contact angle of 108°, an average particle diameter of 90 nm, and a half value period in a reaction with $Mg^{2+}$ ions of 10 sec.

Preparation of Ink Compositions

Ink compositions as shown in Tables 1 and 2 below were prepared according to the following procedure. Ion-exchanged water, a water-soluble organic solvent, and optional additives, such as a saccharide, a surfactant, a pH adjustor, a preservative, and a fungicide, were previously added and mixed together while stirring at room temperature to prepare a liquid mixture. Subsequently, the pigment dispersion prepared above was gradually added dropwise to the liquid mixture with stirring, followed by stirring. The mixture was filtered through a 5 µm-membrane filter to prepare an ink composition. When the fine particles of a polymer was used, an ink composition was prepared as follows. An aqueous emulsion of the fine particles of a polymer dispersed in water was added to and thoroughly mixed with the liquid mixture at room temperature with stirring, followed by gradual dropwise addition of the pigment dispersion with stirring. The mixture was filtered through a 5 µm-membrane filter to prepare an ink composition.

For ink compositions, the amounts of ingredients added are expressed in % by weight.

Comparative Example 1

Carbon black (5% by weight), 3% by weight by weight of an ammonium salt of a styrene/acrylic acid copolymer (molecular weight 8,000, polymer component 38%) as a dispersant, and 20% by weight of water were dispersed in a sand mill. Glycerin (10% by weight), 2% by weight of a nonionic surfactant Noigen EA-160 (manufactured by Dai-ichi Kogyo Seiyaku Co., Ltd.), and water (balance) were then added thereto to prepare an ink.

Comparative Example 2

Carbon black (5% by weight), 3% by weight of an ammonium salt of a styrene/acrylic acid copolymer (molecular weight 7,000, polymer component 38%) as a dispersant, and 20% by weight of water were dispersed in a sand mill. Glycerin (10% by weight), 2% by weight of a nonionic surfactant Noigen EA-160 (manufactured by Daiichi Kogyo Seiyaku Co., Ltd.), 3% by weight of a styrene/acrylic polymer emulsion Microgel E-5002 (manufactured by Nippon Paint Co., Ltd.), and water (balance) were then added thereto to prepare an ink.

Other Comparative Examples

Color inks were prepared according to the formulations shown in Table 3 in the same manner as used in the above comparative examples.

TABLE 1

|  | Ink 1 | Ink 2 | Ink 3 | Ink 4 | Ink 5 | Ink 6 | Ink 7 | Ink 8 | Ink 9 |
| --- | --- | --- | --- | --- | --- | --- | --- | --- | --- |
| Dispersion 1 of pigment | 5.0 | | | | | | 5.0 | | |
| Dispersion 2 of pigment | | 5.0 | | | | | | | |
| Dispersion of magenta pigment | | | 5.0 | | | | | 5.0 | |
| Dispersion of cyan pigment | | | | 5.0 | | | | 5.0 | |
| Dispersion of yellow pigment | | | | | 5.0 | | | | 5.0 |
| Fine particles 1 of polymer | | | | | | 5.0 | 5.0 | | |
| Fine particles 2 of polymer | | | | | | | | 5.0 | |
| Fine particles 3 of polymer | | | | | | | | | 5.0 |
| Fine particles 4 of polymer | | | | | | | | | |
| Olfine E 1010 | 1.0 | | 1.0 | 1.0 | 1.0 | 1.0 | 1.0 | | 1.0 |
| Surfynol 465 | | 1.0 | | | | | | 1.0 | |
| Diethylene glycol monobutyl ether | | | 5.0 | | | | 5.0 | | |
| Triethylene glycol monobutyl ether | | | | | 5.0 | | | | 5.0 |
| 2-Pyrrolidone | 2.0 | 2.0 | 2.0 | 2.0 | 2.0 | 2.0 | 2.0 | 2.0 | 2.0 |
| Maltitol | 5.0 | 5.0 | 5.0 | 5.0 | 5.0 | 5.0 | | | |
| Xylol | | | | | | | 3.0 | 3.0 | 3.0 |
| Glycerin | 15.0 | 15.0 | 15.0 | 15.0 | 15.0 | 10.0 | 10.0 | 10.0 | 10.0 |
| Triethanolamine | 1.0 | 1.0 | 1.0 | 1.0 | 1.0 | 1.0 | 0.5 | 0.5 | 0.5 |
| Potassium hydroxide | 0.1 | 0.1 | 0.1 | 0.1 | 0.1 | 0.1 | 0.1 | 0.1 | 0.1 |
| Ion-exchanged water | Balance | Balance | Balance | Balance | Balance | Balance | Balance | Balance | Balance |

TABLE 2

|  | Ink 10 | Ink 11 | Ink 12 | Ink 13 | Ink 14 | Ink 15 | Ink 16 | Ink 17 | Ink 18 |
| --- | --- | --- | --- | --- | --- | --- | --- | --- | --- |
| Dispersion 1 of pigment | 5.0 | 5.0 | | | | | | | |
| Dispersion 2 of pigment | | | 5.0 | | | 5.0 | | | |
| Dispersion of magenta pigment | | | | 5.0 | | | 5.0 | | |
| Dispersion of cyan pigment | | | | | | | | 5.0 | |
| Dispersion of yellow pigment | | | | | 5.0 | | | | 5.0 |
| Fine particles 1 of polymer | | 5.0 | | | | | | | |
| Fine particles 2 of polymer | | | 5.0 | | | 5.0 | 5.0 | | |
| Fine particles 3 of polymer | | | | 5.0 | | | | | |
| Fine particles 4 of polymer | | | | | 5.0 | | | 5.0 | 5.0 |
| Olfine E 1010 | | | | | | 1.0 | | 1.0 | |
| Surfynol 465 | | | | | | | 1.0 | | 1.0 |
| 2-Pyrrolidone | 2.0 | 2.0 | 2.0 | 2.0 | 2.0 | 2.0 | 2.0 | 2.0 | 2.0 |
| Maltitol | 5.0 | 5.0 | 5.0 | 5.0 | 5.0 | | | | |
| Xylol | | | | | | 5.0 | 5.0 | 5.0 | 5.0 |
| Glycerin | 15.0 | 15.0 | 15.0 | 15.0 | 15.0 | 10.0 | 10.0 | 10.0 | 10.0 |
| Triethanolamine | 1.0 | 1.0 | 1.0 | 1.0 | 1.0 | 1.0 | 1.0 | 1.0 | 1.0 |
| Potassium hydroxide | 0.1 | 0.1 | 0.1 | 0.1 | 0.1 | 0.1 | 0.1 | 0.1 | 0.1 |
| Ion-exchanged water | Balance | Balance | Balance | Balance | Balance | Balance | Balance | Balance | Balance |

TABLE 3

|  | Ink 19 | Ink 20 | Ink 21 | Ink 22 | Ink 23 | Ink 24 |
|---|---|---|---|---|---|---|
| C.I. Pigment Red 122 | 3.0 |  |  | 3.0 |  |  |
| C.I. Pigment Blue 15:3 |  | 3.0 |  |  | 3.0 |  |
| C.I. Pigment Yellow 185 |  |  | 3.0 |  |  | 3.0 |
| Ammonium salt of styrene/acrylic acid copolymer (molecular weight 8,000, polymer component 38%) | 2.0 | 2.0 | 2.0 | 2.0 | 2.0 | 2.0 |
| Fine particles 3 of polymer |  |  |  | 3.0 | 3.0 | 3.0 |
| Maltitol | 2.0 | 2.0 | 2.0 | 2.0 | 2.0 | 2.0 |
| Xylol | 3.0 | 3.0 | 3.0 | 3.0 | 3.0 | 3.0 |
| Glycerin | 10.0 | 10.0 | 10.0 | 10.0 | 10.0 | 10.0 |
| Triethanolamine | 0.5 | 0.5 | 0.5 | 0.5 | 0.5 | 0.5 |
| Potassium hydroxide | 0.1 | 0.1 | 0.1 | 0.1 | 0.1 | 0.1 |
| Ion-exchanged water | Balance | Balance | Balance | Balance | Balance | Balance |

Preparation of Reaction Solutions

Reaction solutions were prepared according to the following formulations.

| Reaction solution 1 | |
|---|---|
| Magnesium nitrate hexahydrate | 25 wt % |
| Triethylene glycol monobutyl ether | 10 wt % |
| Glycerin | 20 wt % |
| Ion-exchanged water | Balance |

| Reaction solution 2 | |
|---|---|
| Magnesium acetate tetrahydrate | 25 wt % |
| Triethylene glycol monobutyl ether | 10 wt % |
| Glycerin | 20 wt % |
| Ion-exchanged water | Balance |

Ink Evaluation Test 1

Droplets of the ink composition were ejected, and deposited on recording media to prepare prints. The prints produced by ink jet recording were evaluated as follows. In the printing, blotted images (100% duty) were formed on the following papers by means of an ink jet printer PM-670C manufactured by Seiko Epson Corporation. The ink density was 720 dpi. The following papers (plain papers) were used for the printing tests.

Xerox P, manufactured by Xerox Corp.

Ricopy 6200, manufactured by Ricoh Co., Ltd.

Xerox 4024, manufactured by Xerox Corp.

Neenah Bond, manufactured by Kimberly-Clark

Xerox R (recycled paper), manufactured by Xerox Corp.

Evaluation 1-1: OD Value

For the prints formed by the above printing, the reflection OD value of the blotted image portion was measured with Macbeth TR 972 manufactured by Macbeth. The results were as shown in Table 4.

Evaluation 1-2: Print Quality

The ink composition was loaded into the ink jet printer PM-670C, and alphabetical characters (24 characters) were continuously printed. For the printed alphabetical characters, the total number of feathered characters in the prints was counted. The results were evaluated according to the following criteria. The results were as shown in Table 5.

A: The total number of feathered characters was less than 350.

B: The total number of feathered characters was 350 to less than 1,000.

C: The total number of feathered characters was not less than 1,000.

Evaluation 1-3: Rubbing/scratch Resistance

The prints produced in evaluation 1-2 were air dried for 24 hr, and the printed characters were then rubbed with a water-base yellow fluorescent marker pen (ZEBRA PEN 2 (tradename)) manufactured by ZEBRA at a marking force of $4.9 \times 10^5$ N/m$^2$, followed by visual inspection for staining of the yellow portion. The results were evaluated according to the following criteria. The results were as shown in Table 4.

A: Rubbing three times caused no stain.

B: For some of the papers, rubbing three times caused stain, although rubbing twice caused no stain.

C: For some of the papers, rubbing twice caused stain, although rubbing once caused no stain.

D: For some of the papers, rubbing once caused stain.

Evaluation 1-4: Waterfastness

Water droplets were dropped on printed areas in the prints produced in evaluation 1-2. The prints were then visually inspected. The results were evaluated according to the following criteria. The results were as shown in Table 4.

A: No change occurred in printed areas on which water droplets had been dropped.

B: Marks (water marks) were formed around printed areas on which water droplets had been dropped.

C: The periphery of printed areas, on which water droplets had been dropped, was blurred.

Evaluation 1-5: Anti-clogging Property

The ink composition was loaded into the ink jet printer PM-670C, and alphameric characters were continuously printed for 10 min. Thereafter, the printer was stopped, and allowed to stand for one hr without capping under an environment of temperature 40° C. and humidity 25%. After the standing, alphameric characters were printed again to determine the number of cleaning operations necessary for print quality equal to that before the standing to be obtained. The results were evaluated according to the following criteria. The results of the evaluation were as shown in Table 4.

A: Print quality equal to the initial print quality could be obtained after 0 to 2 cleaning operations.

B: Print quality equal to the initial print quality could be obtained after 3 to 5 cleaning operations.

C: Print quality equal to the initial print quality could not be obtained even after 6 or more cleaning operations.

Evaluation 1-6: Ejection Stability

The ink composition was loaded into the ink jet printer PM-670C, and alphameric characters were continuously printed. At that time, inspection was performed on dropouts of dots and scattering of ink to determine the time required for dropouts of dots and scattering of ink to occur 10 times in total. The results were evaluated according to the following criteria. The results were as shown in Table 4.

A: 48 hr or more
B: 24 hr to less than 48 hr
C: 1 hr to less than 24 hr density was 360 dpi. The following printing papers (plain papers) were used in the printing test.

Xerox P, manufactured by Xerox Corp.
Ricopy 6200, manufactured by Ricoh Co., Ltd.
Xerox 4024, manufactured by Xerox Corp.
Neenah Bond, manufactured by Kimberly-Clark
Xerox R, (recycled paper), manufactured by Xerox Corp.

Evaluation 2-1: OD Value

For the prints formed by the above printing, the reflection OD value of the blotted image portion was measured with Macbeth TR 972 manufactured by Macbeth. The results were as shown in Table 6.

TABLE 4

|  | Evaluation test 1 | | | | | | | | | | |
| --- | --- | --- | --- | --- | --- | --- | --- | --- | --- | --- | --- |
|  | Ex. 1 Ink 1 | Ex. 2 Ink 2 | Ex. 3 Ink 3 | Ex. 4 Ink 4 | Ex. 5 Ink 5 | Ex. 6 Ink 6 | Ex. 7 Ink 7 | Ex. 8 Ink 8 | Ex. 9 Ink 9 | Comp. Ex. 1 | Comp. Ex. 2 |
| 1-1: OD value | 1.28 | 1.32 | 1.34 | 1.33 | 1.34 | 1.3 | 1.32 | 1.31 | 1.32 | 1.12 | 1.12 |
| 1-3: Rubbing/scratch resistance | B | B | B | B | B | A | A | A | A | C | C |
| 1-4: Waterfastness | A | A | A | A | A | A | A | A | A | C | C |
| 1-5: Anti-clogging properties | A | A | A | A | A | A | A | A | A | C | C |
| 1-6: Ejection stability | A | A | A | A | A | A | A | A | A | C | C |

TABLE 5

|  | Evaluation test 1 | | | | | | | | | | |
| --- | --- | --- | --- | --- | --- | --- | --- | --- | --- | --- | --- |
|  | Ex. 1 | Ex. 2 | Ex. 3 | Ex. 4 1-2: Print quality | Ex. 5 | Ex. 6 | Ex. 7 | Ex. 8 | Ex. 9 | Comp. | Comp. |
|  | Ink 1 | Ink 2 | Ink 3 | Ink 4 | Ink 5 | Ink 6 | Ink 7 | Ink 8 | Ink 9 | Ex. 1 | Ex. 2 |
| Xerox P | A | A | A | A | A | A | A | A | A | C | C |
| Xerox 4024 | A | A | A | A | A | A | A | A | A | C | C |
| Xerox R | A | A | A | A | A | A | A | A | A | C | C |
| Neenah Bond | A | A | A | A | A | A | A | A | A | C | C |
| Ricopy 6200 | A | A | A | A | A | A | A | A | A | C | C |

Ink Evaluation Test 2

Prints produced by an ink jet recording method, wherein droplets of the ink composition and droplets of the reaction solution were ejected and deposited onto a recording medium to provide a record, were evaluated as follows. Ink compositions and reaction solutions used were as summarized in Table 6 below.

For the printing, an ink jet recording apparatus as shown in FIG. 5, provided with a recording head shown in FIG. 4, was used. The ink jet recording apparatus performs printing by depositing, on a recording medium, an ink composition and a reaction solution containing a reactant capable of producing coagulate upon contact with the ink composition, and comprises: means for depositing the reaction solution onto the recording medium; means for depositing the ink composition onto the recording medium to record an image; and ink jet recording means for controlling means for depositing the reaction solution onto the recording medium and means for depositing the ink composition onto the recording medium to record an image.

In the printing, immediately after the reaction solution was allowed to impact against the test paper by means of the ink jet recording apparatus, the ink composition was allowed to impact against the position where the reaction solution impacted, thereby printing a blotted image (100% duty). The amount of the ink composition ejected and the amount of the reaction solution ejected each were 0.07 µg/dot, and the Evaluation 2-2: Print Quality (Feathering)

The ink composition was loaded into the ink jet printer PM-670C, and alphabetical characters (24 characters) were continuously printed. For the printed alphabetical characters, the total number of feathered characters in the prints was counted. The results were evaluated according to the following criteria. The results were as shown in Table 6.

A: The total number of feathered characters was less than 100.
B: The total number of feathered characters was 100 to less than 250.
C: The total number of feathered characters was 250 to less than 350.
D: The total number of feathered characters was 350 to less than 500.
E: The total number of feathered characters was 500 to less than 1,000.
F: The total number of feathered characters was not less than 1,000.

Evaluation 2-3: Rubbing/scratch Resistance

The prints produced in evaluation 2-1 were allowed to stand for one hr, and the printed characters were then rubbed with a water-base yellow fluorescent marker pen (ZEBRA PEN 2 (tradename)) manufactured by ZEBRA at a marking force of $4.9 \times 10^5$ N/m$^2$, followed by visual inspection for staining of the yellow portion. The results were evaluated according to the following criteria. The results were as shown in Table 6.

A: Rubbing three times caused no stain.

B: For some of the papers, rubbing three times caused stain, although rubbing twice caused no stain.

C: For some of the papers, rubbing twice caused stain, although rubbing once caused no stain.

D: For some of the papers, rubbing once caused stain.

Evaluation 2-4: Fast Drying Property

For prints produced in evaluation 2-1, immediately after printing, the same type of paper as used in the test was put on top of the print, and a load of 250 g/cm² was applied to the laminate. At that time, the time required for the printed ink no longer to be transferred onto the paper was determined as a fast drying property. The fast drying property was evaluated according to the following criteria. The results were as shown in Table 6.

A: Less than 10 sec

Printing on the above-described printing papers was performed using ink sets and reaction solutions by means of the ink jet recording apparatus.

In this case, the reaction solution was first printed at 100% duty, and color inks (cyan, magenta, and yellow inks) were then printed. The prints were visually inspected for uneven color mixing in boundaries of different colors. The results were evaluated according to the following criteria. For both the reaction solution and the inks, the amount thereof ejected was 0.7 μg/dot, and the density was 360 dpi. The results were as shown in Table 6.

A: No color mixing occurred, and the boundaries between adjacent colors were clear.

B: Feather-like color mixing occurred.

C: Significant color mixing occurred to such an extent that the boundaries between adjacent colors blurred.

TABLE 6

| | Ink set | Ink | Reaction solution | Evaluation 2-1 Print density (OD value) | Evaluation 2-2 Print quality | Evaluation 2-3 Rubbing/ scratch resistance | Evaluation 2-4 Fast drying properties | Evaluation 2-5 Water- fastness | Evaluation 2-6 Color bleeding |
|---|---|---|---|---|---|---|---|---|---|
| Ex. 10 | — | Ink 10 | Reaction solution 1 | 1.56 | A | B | B | A | — |
| Ex. 11 | Ink set 1 | Ink 11 | Reaction solution 1 | 1.60 | A | B | B | A | A |
| | | Ink 12 | Reaction solution 1 | 1.55 | A | B | B | A | |
| | | Ink 13 | Reaction solution 1 | 1.55 | A | B | B | A | |
| | | Ink 14 | Reaction solution 1 | 1.55 | A | B | B | A | |
| Ex. 12 | Ink set 2 | Ink 15 | Reaction solution 1 | 1.52 | A | A | A | A | A |
| | | Ink 16 | Reaction solution 1 | 1.48 | A | A | A | A | |
| | | Ink 17 | Reaction solution 1 | 1.48 | A | A | A | A | |
| | | Ink 18 | Reaction solution 1 | 1.48 | A | A | A | A | |
| Ex. 13 | Ink set 3 | Ink 11 | Reaction solution 2 | 1.60 | A | B | B | A | A |
| | | Ink 12 | Reaction solution 2 | 1.55 | A | B | B | A | |
| | | Ink 13 | Reaction solution 2 | 1.55 | A | B | B | A | |
| | | Ink 14 | Reaction solution 2 | 1.55 | A | B | B | A | |
| Ex. 14 | Ink set 4 | Ink 15 | Reaction solution 2 | 1.52 | A | A | A | A | A |
| | | Ink 16 | Reaction solution 2 | 1.48 | A | A | A | A | |
| | | Ink 17 | Reaction solution 2 | 1.48 | A | A | A | A | |
| | | Ink 18 | Reaction solution 2 | 1.48 | A | A | A | A | |
| Comp. Ex. 3 | Ink set 5 | Comp. Ex. 1 | Reaction solution 1 | 1.26 | C | C | E | A | B |
| | | Ink 19 | Reaction solution 1 | 1.21 | C | C | E | A | |
| | | Ink 20 | Reaction solution 1 | 1.22 | C | C | E | A | |
| | | Ink 21 | Reaction solution 1 | 1.20 | C | C | E | A | |
| Comp. Ex. 4 | Ink set 6 | Comp. Ex. 2 | Reaction solution 1 | 1.28 | C | A | D | A | A |
| | | Ink 22 | Reaction solution 1 | 1.23 | C | A | D | A | |
| | | Ink 23 | Reaction solution 1 | 1.22 | C | A | D | A | |
| | | Ink 24 | Reaction solution 1 | 1.23 | C | A | D | A | |

B: 10 to less than 20 sec

C: 20 to less than 30 sec

D: 30 to less than 60 sec

E: Not less than 60 sec

Evaluation 2-5: Waterfastness

Water droplets were dropped on printed areas in the prints produced in evaluation 2-1. The prints were then visually inspected. The results were evaluated according to the following criteria. The results of the evaluation were as shown in Table 6.

A: No change occurred in printed areas on which water droplets had been dropped.

B: Marks (water marks) were formed around printed areas on which water droplets had been dropped.

C: The periphery of printed areas, on which water droplets had been dropped, was blurred.

Evaluation 2-6: Color Bleeding

What is claimed is:

1. An ink composition for ink jet recording, comprising at least a water-based pigment dispersion, a water soluble organic solvent, and water, the water-based pigment dispersion being such that a pigment has been encapsulated in a polymer produced from a polymerizable surfactant having both nonionic hydrophilicity and anionic hydrophilicity and a monomer having a ligand structure which can combine with a metal ion to form a chelate, wherein the water-based pigment dispersion has been produced by dispersing the pigment with the aid of the polymerizable surfactant optionally in water and/or a water-soluble organic solvent and then polymerizing the dispersion together with the monomer.

2. The ink composition according to claim 1, wherein the polymerizable surfactant is a compound represented by formula (I):

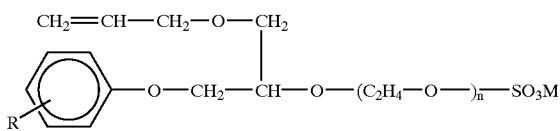

(I)

wherein
R represents a hydrogen atom or a hydrocarbon residue having 1 to 12 carbon atoms; n is a number of 2 to 20; and M represents an alkali metal atom, an ammonium salt, or an alkanolamine.

3. The ink composition according to claim 1, wherein the ligand structure of the monomer, which can combine with the metal ion to form a chelate, is selected from the group consisting of β-diketone, polyamine, iminodiacetic acid, sarcosine, ethanolamino acid, glycine, xanthogenic acid, amidoxime, amine, pryidine, imidazole, phosphonic acid, phosphinic acid, phosphoric acid, Schiff base, oxime, hydroxame, aminopolycarboxylic acid, thiol, polythioalcohol, 2-pyrroliodone, and 2-oxazolidone structures.

4. The ink composition according to claim 1, wherein the ligand structure, which can combine with the metal ion to form a chelate, is represented by the following formula:

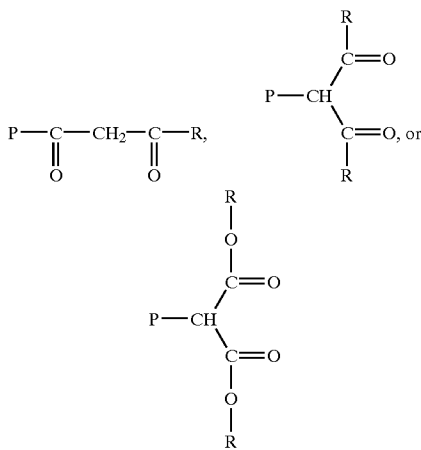

wherein
P represents a polymerizable structure portion of the monomer; and R represents an alkyl or aryl group.

5. The ink composition according to claim 1, wherein the monomer having the ligand structure, which can combine with the metal ion to form a chelate, is selected from the group consisting of methacryloyl acetone, methacryloyldiacetylmethane, acryloyl acetyl acetone, diethyl acryloylmalonate, diethyl methacryloylmalonate, and 2-(methacryloxy)ethyl acetoacetate.

6. The ink composition according to claim 1, wherein a monomer, which, together with the polymerizable surfactant, can form a polymer, has been further used in the formation of the water-based pigment dispersion.

7. The ink composition according to claim 6, wherein the monomer is selected from the group consisting of acrylic acid, acrylic esters, methacrylic acid, and methacrylic esters.

8. The ink composition according to claim 6, wherein the monomer is an electron-accepting monomer.

9. The ink composition according to claim 8, wherein the electron-accepting monomer is selected from the group consisting of diesters of fumaric acid, diesters of maleic acid, maleimides, and vinylidene cyanide.

10. The ink composition according to claim 1, wherein the water-based pigment dispersion has been produced by further performing wet grinding after the polymerization.

11. The ink composition according to claim 1, which contains 1 to 20% by weight of the water-based pigment dispersion.

12. The ink composition according to claim 1, which further comprises fine particles of a polymer.

13. The ink composition according to claim 12, wherein the fine particles of a polymer are comprised of a polymer having a film-forming property.

14. The ink composition according to claim 12, wherein the fine particles of a polymer have a minimum film-forming temperature of 30° C. or below.

15. The ink composition according to claim 12, wherein the content of the fine particles of a polymer is 0.1 to 25% by weight based on the ink composition.

16. The ink composition according to claim 12, wherein the fine particles of a polymer have a diameter of not more than 400 nm.

17. The ink composition according to claim 12, wherein the fine particles of a polymer have a film-forming property, have carboxyl groups on the surface thereof, and have a reactivity with a divalent metal salt such that, when 3 volumes of a 0.1 wt % aqueous emulsion is brought into contact with one volume of a 1 mol/liter aqueous divalent metal salt solution, the time required for the transmission of light having a wavelength of 700 nm to become 50% of the initial value is not more than $1 \times 10^4$ sec.

18. The ink composition according to claim 12, wherein an aqueous emulsion prepared by dispersing the fine particles of a polymer in water and adjusting the concentration of the aqueous emulsion to 10% by weight has a contact angle on a teflon sheet of not less than 70 degrees.

19. The ink composition according to claim 12, wherein the fine particles of a polymer contain 1 to 10% by weight of a structure derived from an unsaturated vinyl monomer having a carboxyl group and has a structure crosslinked by a crosslinkable monomer having two or more polymerizable double bonds with the content of the structure derived from the crosslinkable monomer being 0.2 to 4% by weight.

20. The ink composition according to claim 12, wherein the fine particles of a polymer have a core/shell structure.

21. The ink composition according to claim 20, wherein the core comprises an epoxy-containing resin while the shell comprises a carboxyl-containing resin.

22. The ink composition according to claim 12, wherein the fine particles of a polymer are self-crosslinkable.

23. The ink composition according to claim 1, wherein the water-soluble organic solvent has a boiling point of 180° C. or above.

24. The ink composition according to claim 1, which further contains a glycol ether and/or an acetylene glycol surfactant.

25. An ink jet recording method comprising the steps of: ejecting droplets of an ink composition; and depositing the droplets onto a recording medium to perform printing, the ink composition being one according to claim 1.

26. A record produced by the ink jet recording method according to claim 25.

27. An ink set for ink jet recording, comprising the ink composition according to claim 1.

28. An ink jet recording method comprising the step of depositing, on a recording medium, an ink composition and a reaction solution containing a reactant which, when brought into contact with the ink composition, produces coagulate, thereby performing printing, the ink composition being one according to claim 1.

29. The ink jet recording method according to claim 28, wherein the reactant is a metal salt.

30. The ink jet recording method according to claim 29, wherein the metal salt is a nitrate or a carboxylate.

31. The ink jet recording method according to claim 30, wherein carboxylic acid ions constituting the carboxylate have been derived from a saturated aliphatic monocarboxylic acid having 1 to 6 carbon atoms and wherein the hydrogen atoms on the saturated aliphatic hydrocarbon group in the monocarboxylic acid are optionally substituted by a hydroxyl group, or a carbocyclic monocarboxylic acid having 6 to 10 carbon atoms.

32. The ink jet recording method according claim 28, wherein the reaction solution further contains triethylene glycol monobutyl ether and glycerin.

33. The ink jet recording method according to claim 28, wherein the step of depositing the droplets of the ink composition on the recording medium is carried out after the step of depositing the reaction solution onto the recording medium.

34. The ink jet recording method according to claim 28, wherein the step of depositing the droplets of the ink composition on the recording medium is carried out before the step of depositing the reaction solution onto the recording medium.

35. A record produced by the ink jet recording method according to claim 28.

36. An ink jet recording apparatus for performing printing by depositing, on a recording medium, an ink composition according to claim 1 and a reaction solution containing a reactant which, when brought into contact with the ink composition, produces coagulate, said apparatus comprising:
  means for depositing the reaction solution onto the recording medium;
  means for depositing the ink composition onto the recording medium to record an image; and
  ink jet recording means for controlling means for depositing the reaction solution onto the recording medium and means for depositing the ink composition onto the recording medium to record an image.

37. A record produced by printing by means of the recording apparatus according to claim 36.

* * * * *